(12) United States Patent
Ochi et al.

(10) Patent No.: US 7,957,535 B2
(45) Date of Patent: Jun. 7, 2011

(54) DATA STORING METHOD, DATA PLAYBACK METHOD, DATA RECORDING DEVICE, DATA PLAYBACK DEVICE, AND RECORDING MEDIUM

(75) Inventors: Makoto Ochi, Osaka (JP); Kazuya Fujimura, Nara (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 999 days.

(21) Appl. No.: 11/813,740

(22) PCT Filed: Jan. 18, 2006

(86) PCT No.: PCT/JP2006/300589
§ 371 (c)(1),
(2), (4) Date: Jul. 11, 2007

(87) PCT Pub. No.: WO2006/077850
PCT Pub. Date: Jul. 27, 2006

(65) Prior Publication Data
US 2009/0013195 A1 Jan. 8, 2009

(30) Foreign Application Priority Data

Jan. 18, 2005 (JP) .............................. 2005-009876

(51) Int. Cl.
*G06F 21/00* (2006.01)
(52) U.S. Cl. ......................................... 380/277; 705/53
(58) Field of Classification Search .................... 705/53
See application file for complete search history.

(56) References Cited

U.S. PATENT DOCUMENTS

| 7,194,091 | B2 * | 3/2007 | Higashi et al. | ................. 380/202 |
| 7,644,446 | B2 * | 1/2010 | Strom et al. | .................... 726/32 |
| 2003/0046238 | A1 | 3/2003 | Nonaka et al. | |
| 2003/0177379 | A1 | 9/2003 | Hori et al. | |
| 2004/0054678 | A1 * | 3/2004 | Okamoto et al. | ............. 707/100 |
| 2005/0182728 | A1 | 8/2005 | Matsukawa et al. | |

FOREIGN PATENT DOCUMENTS

| JP | 2001-175606 | 6/2001 |
| JP | 2003 030056 | 1/2003 |
| JP | 2003-271457 | 9/2003 |
| JP | 2003-281172 | 10/2003 |
| JP | 2004-094677 | 3/2004 |

OTHER PUBLICATIONS

PCT International Search Report dated Mar. 7, 2006.
K. Uota, et al., "Series Keiei Joho System vol. 8 Database," Kabushiki Kaisha Nikkagiren Shuppansha, Jun. 15, 2003, pp. 127-128, 163-165, with English translation.

\* cited by examiner

*Primary Examiner* — Matthew B Smithers
(74) *Attorney, Agent, or Firm* — Dickinson Wright PLLC

(57) ABSTRACT

A method for performing a high-speed search for a content key associated with encrypted content for a key-separation-type content management method where content keys and pieces of encrypted content are correlated by ID information and stored in different recording media. An external recording medium stores content files including: pieces of encrypted content that are encrypted with different encryption keys; and content IDs, each associated with a corresponding piece of encryption content, and a semiconductor recording medium stores a list including: encryption key storage location information, each indicating where a corresponding encryption key is stored; and content IDs, the list sorted in accordance with the content IDs. When encrypted content is played back, the list is searched to find encryption key storage location information associated with content ID that matches the content ID of the encrypted content, and the encryption key is read based on the encryption key storage location information.

28 Claims, 27 Drawing Sheets

DATA STORING METHOD, DATA PLAYBACK METHOD, DATA RECORDING DEVICE, DATA PLAYBACK DEVICE, AND RECORDING MEDIUM

TECHNICAL FIELD

The present invention relates to data storing methods for storing digitized content, such as music, animation and books, into a recording medium, data playback methods for playing back the content, data recording devices employing the data storing methods, data playback devices employing the data playback methods, and recording media for use in implementation of the data storing methods and the data playback methods.

BACKGROUND ART

There are various recording media, including a semiconductor recording medium, a magnetic disk, an optical disk, and a magneto-optical disk, which record various types of digital data (hereinafter, referred to as the "content"), such as music content, animation content, and still image content. Among them, in particular, the semiconductor recording medium has characteristics of being compact and light-weight, and therefore can be used in various devices, including digital cameras, cell phones, mobile music players, television sets, and DVD recorders. Representative examples of the semiconductor recording medium include an SD memory card, Memory Stick®, and Compact Flash®.

Some of such semiconductor recording media have a copyright protection function as the SD memory card does. The copyright protection function prevents copyrighted content from being illegally copied, thereby allowing safe recording and playback.

The following is a description of an exemplary content storing method realized by a semiconductor recording medium having the copyright protection function.

The semiconductor recording medium includes: a protected area that cannot be accessed by a host device (a data playback device or a data recording device) until the semiconductor recording medium and the host device mutually authenticate their validities; and an user data area that can be freely accessed by the host device. Content that has been encrypted (hereinafter, referred to as the "encrypted content") is recorded to the user data area, and a key used to encrypt the content (hereinafter, referred to as the "content key") is stored to the protected area.

The content recorded in such a manner can be prohibited from being played back in invalid devices for which mutual validity authentication is not possible. This is true because the invalid devices cannot read the content key and therefore cannot decrypt the encrypted content. Furthermore, although only the encrypted content stored in the user data area can be copied to another recording medium, the invalid devices cannot copy the content key, and therefore no content key can exist in the copy destination recording medium. Thus, it is possible to prohibit illegally-copied encrypted content from being played back.

Conventionally, types of content that are stored to semiconductor recording media having the copyright protection function in accordance with the above-described storing method are mainly music content ripped from music CDs purchased by users, and music and book content downloaded from content providers by paying a given amount of money using personal computers (PCs) and cell phone terminals that are connected to Internet networks. A popular usage pattern is to record such content to the semiconductor recording medium, and play the music content stored in the semiconductor recording medium, or read the content in the case of a book, using a compliant device such as a compact semiconductor player or a cell phone terminal.

Furthermore, in recent years, along with such a content usage pattern, a so-called "superdistribution" method for managing content separately from keys has attracted attention, in which content keys and encrypted content are stored to different recording media, such that the content keys are stored to a semiconductor recording medium having the copyright protection function, whereas the encrypted content is recorded to a magnetic disk, an optical disk, or a magneto-optical disk.

Such a key-separation-type content management method allows the encrypted content to be distributed to users in the form of a magnetic disk, an optical disk, or a magneto-optical disk, which has the content prestored therein and is relatively inexpensive compared to the semiconductor recording medium. Therefore, content providers, which distribute content, can create various business opportunities, while the users can enjoy more convenience than they could do conventionally.

The key-separation-type content management method requires correlation between a content key and encrypted content when the encrypted content is recorded or played back. One method for such correlation is to assign uniquely identifiable ID information to both the content key and the encrypted content, and correlate them using their respective pieces of ID information as indices. In Patent Document 1, the content key and the encrypted content as described above are assigned with their respective pieces of unique ID information, and stored and managed in different locations, and the pieces of ID information are used as indices to decrypt the encrypted content.

Patent Document: Japanese Laid-Open Patent Publication No. 2003-30056

DISCLOSURE OF THE INVENTION

Problem to be Solved by the Invention

The above-mentioned conventional method, however, has the following problem. Specifically, in a data playback device or suchlike, when searching for encrypted content based on a content key, and decrypting and decoding the found encrypted content, a considerable process is required for searching for ID information of the encrypted content based on the content key and then the encrypted content itself based on the found ID information, making it difficult to perform high-speed search.

Therefore, it is conceivable to employ a method in which data is prestored in a manner correlated with the ID information, and when search is required, the correlated information is used to achieve high-speed search (e.g., the method storing/holding data, for example, in ascending or descending order of the ID information). In this method, however, it is necessary to change existing data organization each time data is stored. This can be readily achieved in a system, such as a database server, which requires a large-scale processing ability, but it is difficult to achieve in a device with a limited processing ability, such as a stationary or mobile AV device, which uses content stored in accordance with the key-separation-type content management method. Accordingly, in the key-separation-type content management method, it is desirable to use a method in which the content key and the encrypted content are stored so as to change existing stored data as little as possible.

In view of the above problem, the present invention aims to provide data storing methods and data playback methods, which allow a device with a limited processing ability to search for encrypted content at high speed based on a content key, which is correlated with the content by ID information and stored in accordance with the key-separation-type content management method, and the methods also allows high-speed search in reverse order.

Means for Solving the Problem

To achieve the above objective, a first data storing method of the present invention includes the steps of:

(a) storing a plurality of content files to a first recording medium, wherein the content files contain their respective pieces of encrypted content that are encrypted with different encryption keys, and their respective pieces of ID information, each being uniquely assigned to a corresponding piece of the encrypted content;

(b) storing a plurality of pieces of key information to a second recording medium, wherein each piece of the key information contains an encryption key and a piece of ID information in association with a corresponding piece of the encrypted content; and (c) generating and storing a list to the second recording medium, wherein the list contains pieces of encryption key storage location information, each indicating where a corresponding one of the encryption keys is stored, and pieces of ID information, each being associated with a corresponding one of the encryption keys, and the list is sorted in accordance with the pieces of ID information.

In addition, a second data storing method of the present invention includes the steps of:

(a) storing a plurality of content files to a first recording medium, wherein the content files contain their respective pieces of encrypted content that are encrypted with different encryption keys, and their respective pieces of ID information, each being uniquely assigned to a corresponding piece of the encrypted content;

(b) storing a plurality of pieces of key information to a second recording medium, wherein each piece of the key information contains an encryption key and a piece of ID information in association with a corresponding piece of the encrypted content; and (c) generating and storing a list to the first recording medium, wherein the list contains pieces of content storage location information, each indicating where a corresponding piece of the encrypted content is stored, and pieces of ID information, each being associated with a corresponding piece of the encrypted content, and the list is sorted in accordance with the pieces of ID information.

In the first or second data storing method of the present invention, the first and second recording media may constitute the same recording medium. In addition, the key information or the list contains information that indicates whether the content file and its corresponding encryption key are stored in the same recording medium.

In addition, a third data storing method of the present invention includes the steps of:

(a) storing a plurality of content files to a first recording medium, wherein the content files contain their respective pieces of encrypted content that are encrypted with different encryption keys, and their respective pieces of ID information, each being uniquely assigned to a corresponding piece of the encrypted content;

(b) storing a plurality of pieces of key information to a second recording medium, wherein each piece of the key information contains an encryption key and a piece of ID information in association with a corresponding piece of the encrypted content, and also contains a piece of content storage location information, which indicates where the corresponding piece of the encrypted content is stored.

In the third data storing method of the present invention, the content storage location information may contain device information concerning a device into which the first recording medium is loaded.

In addition, in the third data storing method of the present invention, the key information may be composed of a plurality of pieces of information associated with the same ID information but different pieces of the device information. Also, the key information may contain pointer information that designates another piece of the key information associated with the same ID information.

In addition, the key information may contain a plurality of pieces of the content storage location information. Also, the key information may contain information that indicates whether the content file and its corresponding encryption key are stored in the same recording medium.

In addition, a fourth data storing method of the present invention includes the steps of:

(a) recording a plurality of content files to a first recording medium, wherein the content files contain: their respective pieces of encrypted content that are encrypted with different encryption keys; their respective pieces of ID information, each being uniquely assigned to a corresponding piece of the encrypted content; and their respective pieces of key storage location information, each indicating where a corresponding one of the encryption keys associated with their respective pieces of the encrypted content is stored; and (b) recording a plurality of pieces of key information to a second recording medium, wherein each piece of the key information contains an encryption key and a piece of ID information in association with a corresponding piece of the encrypted content.

Next, to achieve the above objective, a first data playback method of the present invention includes the steps of:

(a) reading a piece of ID information that is associated with a piece of content that is to be played back, from a first recording medium having a plurality of content files stored therein, wherein the content files contain their respective pieces of encrypted content that are encrypted with different encryption keys, and their respective pieces of the ID information, each being uniquely assigned to a corresponding piece of the encrypted content;

(b) reading a list from a second recording medium having stored therein a plurality of pieces of key information and the list,
   wherein each piece of the key information contains an encryption key and a piece of ID information in association with a corresponding piece of the encrypted content, and
   wherein the list contains pieces of encryption key storage location information, each indicating where a corresponding one of the encryption keys is stored, and pieces of ID information, each being associated with a corresponding one of the encryption keys, and the list is sorted in accordance with the pieces of ID information;

(c) searching the list to find a piece of the encryption key storage location information that is associated with a piece of the ID information that matches the ID information read from the first recording medium, and reading one of the encryption keys that is associated with the piece of the ID information from the key information based on the found encryption key storage location information; and (d) decrypting the encrypted content read from the first recording medium with the encryption key read from the second recording medium.

In addition, a second data playback method of the present invention includes the steps of:

(a) reading a piece of ID information that is associated with a piece of content that is to be played back, from a second recording medium having a plurality of pieces of key information stored therein, wherein the plurality of pieces of key information contain: their respective encryption keys associated with their respective pieces of encrypted content that are encrypted with different encryption keys and stored in a first recording medium; and their respective pieces of ID information, each being uniquely assigned to a corresponding piece of the encrypted content;

(b) reading a list from the first recording medium having stored therein a plurality of content files and the list, wherein the content files each contain a corresponding piece of the encrypted content and a piece of ID information associated therewith, and wherein the list contains pieces of content storage location information, each indicating where a corresponding piece of the encrypted content is stored, and pieces of ID information, each being associated with a corresponding piece of the encrypted content, and the list is sorted in accordance with the pieces of ID information;

(c) searching the list to find a piece of the content storage location information that is associated with a piece of the ID information that matches the ID information read from the second recording medium, and reading a piece of the encrypted content that is associated with the piece of the ID information from the first recording medium based on the found content storage location information;

(d) reading one of the encryption keys that is associated with the piece of the ID information from the second recording medium; and (e) decrypting the encrypted content read from the first recording medium with the encryption key read from the second recording medium.

In addition, a third data playback method of the present invention includes the steps of:

(a) reading a piece of content storage location information that is associated with a piece of content that is to be played back from a second recording medium with reference to a piece of ID information, wherein the second recording medium has a plurality of pieces of key information stored therein, and the plurality of pieces of key information contain: their respective encryption keys associated with their respective pieces of encrypted content that are encrypted with different encryption keys and stored in a first recording medium; their respective pieces of the ID information, each being uniquely assigned to a corresponding piece of the encrypted content; and their respective pieces of content storage location information, each indicating where a corresponding piece of the encrypted content is stored;

(b) reading a piece of the encrypted content that is associated with the piece of the ID information from the first recording medium based on the content storage location information read from the second recording medium, wherein the first recording medium has a plurality of content files stored therein, and the content files each contain a corresponding piece of the encrypted content and a piece of ID information associated with the corresponding piece of the encrypted content; and (c) reading one of the encryption keys that is associated with the piece of the ID information from the second recording medium, and decrypting the encrypted content read from the first recording medium, with the one of the encryption keys.

In addition, a fourth data playback method of the present invention includes the steps of:

(a) reading a piece of key storage location information that is associated with a piece of content that is to be played back from a first recording medium with reference to a piece of ID information, wherein the first recording medium has stored therein pieces of encrypted content that are encrypted with different encryption keys and a plurality of pieces of key information, and the plurality of pieces of key information contain their respective pieces of ID information, each being uniquely assigned to a corresponding piece of the encrypted content, and their respective pieces of the key storage location information, each indicating where a corresponding one of the encryption keys associated with their respective pieces of the encrypted content is stored;

(b) reading an encryption key associated with the piece of the ID information from the second recording medium based on the key storage location information read from the first recording medium, wherein the second recording medium has a plurality of pieces of key information stored therein, and the plurality of pieces of key information contain their respective encryption keys and their respective pieces of ID information in association with their corresponding pieces of the encrypted content;

(c) reading a piece of the encrypted content that is associated with the piece of the ID information from the first recording medium; and (d) decrypting the encrypted content read from the first recording medium, with the encryption key read from the second recording medium.

In addition, the present invention encompasses data recording devices employing each of the above data storing methods and data playback devices employing each of the above data playback methods. Furthermore, the present invention encompasses recording media used for implementing each of the above data storing methods and data playback methods.

Effect of the Invention

The data storing methods and the data playback methods of the present invention make it possible to achieve high-speed search for encrypted content associated with a content key, or a content key associated with encrypted content, even if there is an increase in the number of stored content keys and the number of pieces of stored encrypted content in the case of the key-separation-type content management method where the content keys and their corresponding pieces of encrypted content are stored and managed in different recording media.

BEST MODES FOR CARRYING OUT THE INVENTION

Hereinafter, embodiments of the present invention will be described with reference to the drawings.

First Embodiment

Figure 1:
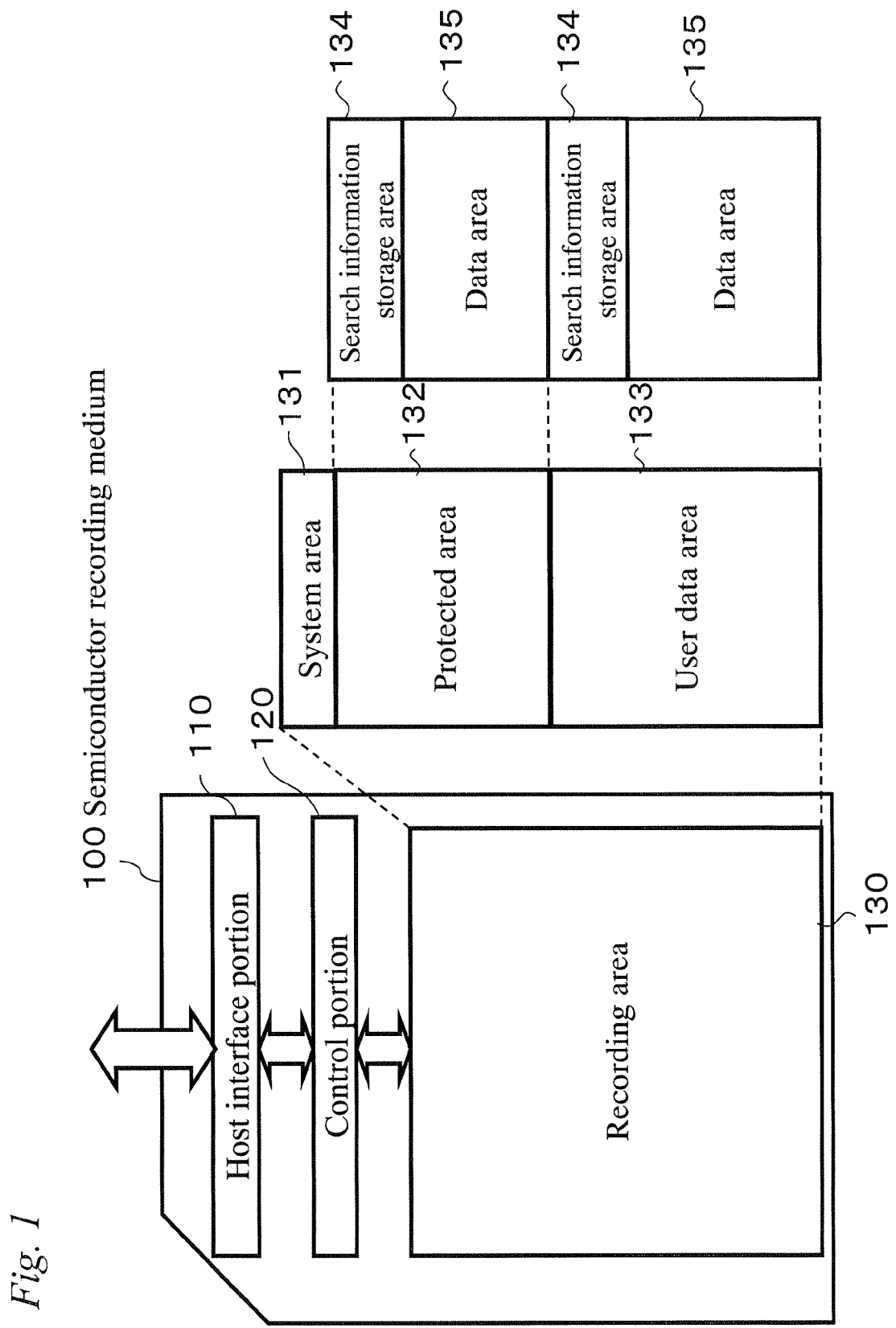
FIG. 1 is a diagram illustrating the internal structure of a semiconductor recording medium.

First, the internal structure of a semiconductor recording medium for storing content keys is described with reference to FIG. 1.

The semiconductor recording medium 100 is composed of a host interface portion 110, a control portion 120, and a recording area 130. The host interface portion 110 exchanges data with a host device (e.g., a data recording device or a data playback device, not shown) for the semiconductor recording medium 100.

On the other hand, the control portion 120 internally controls the semiconductor recording medium 100. Specifically, the control portion 120 interprets a read or write command received from the host device, and accesses the recording area 130. In addition, it notifies the result as necessary to the host device via the host interface portion 110.

The recording area 130 stores digital data. Physically, it is composed of nonvolatile memory such as flash memory, and divided into a system area 131, a protected area 132, and an user data area 133.

The system area 131 is an area in which to store digital data that is to be internally used within the semiconductor recording medium 100, and the host device is not allowed to directly access this area. During the production of the semiconductor recording medium 100, a medium unique key, which is a value unique to each respective semiconductor recording medium to be described later, is stored to the system area 131.

The protected area 132 is an area that can be accessed only after the host device and the semiconductor recording medium 100 mutually authenticate their validities. Accordingly, only the host device that has succeeded in authentication can read/write digital data from/to the protected area 132.

The user data area 133 is an area from/to which the host device can read/write digital data without mutual validity authentication with the semiconductor recording medium 100.

The protected area 132 and the user data area 133 are each divided into a search information storage area 134 and a data area 135. The search information storage area 134 is an area in which to store information (address, size, etc.), which is required when the host device retrieves digital data stored in the data area 135. On the other hand, the data area 135 is an area in which to store arbitrary digital data.

In the present embodiment, the digital data is managed by a FAT file system, and information (file system management information) required by the FAT file system is stored to the search information storage area 134. Note that the details of the FAT file system are generally well-known, and therefore the description thereof will be omitted.

Next, a method for storing the content key and the content will be described with reference to FIG. 2.

Figure 2:
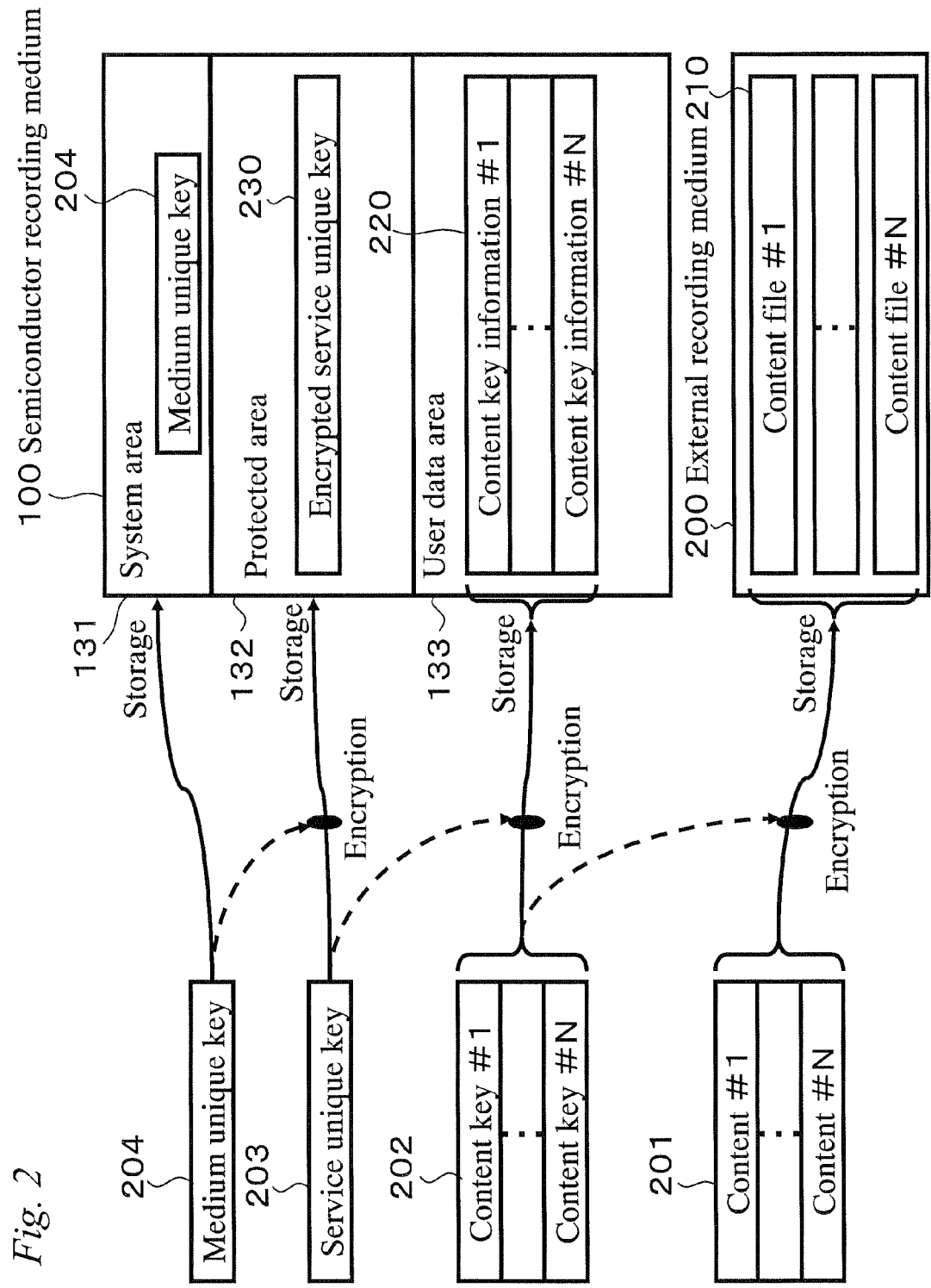
FIG. 2 is a diagram illustrating a general method for storing content and content keys.

FIG. 2 is a diagram illustrating a general method in which the content is stored to an external recording medium 200, and the content key is stored to the semiconductor recording medium 100. Here, the content refers to digital data: image data, music data, or character data that is distributed via the Internet or a communication line of a mobile terminal or suchlike; video data or audio data that is stored in a CD, an MD, a DVD or the like; video data, music data, or character data that is stored in an HDD of a PC as a file; or data generated by the user through video/audio recording.

In FIG. 2, N pieces of content (content #1, content #N) 201 are respectively encrypted with N content keys (content key #1, . . . , content key #N) 202, so that N content files (content file #1, . . . , content file) 210 are stored in the external recording medium 200 different from the semiconductor recording medium 100.

The N content keys (content key #1, . . . , content key #N) 202 are encrypted with an arbitrarily-determined service unique key 203, so that N pieces of content key information (content key information #1, . . . , content key information #N) 220 are stored to the user data area 133 of the semiconductor recording medium 100.

The service unique key 203 is encrypted with a medium unique key 204, which is a key unique to the semiconductor recording medium 100, and the encrypted service unique key 230 is stored to the protected area 132 of the semiconductor recording medium 100.

The medium unique key 204 itself is stored to the system area 131 at the time the semiconductor recording medium 100 is produced. The host device is allowed to read the medium unique key 204 only after the host device and the semiconductor recording medium 100 mutually authenticate their validities.

Figure 3:
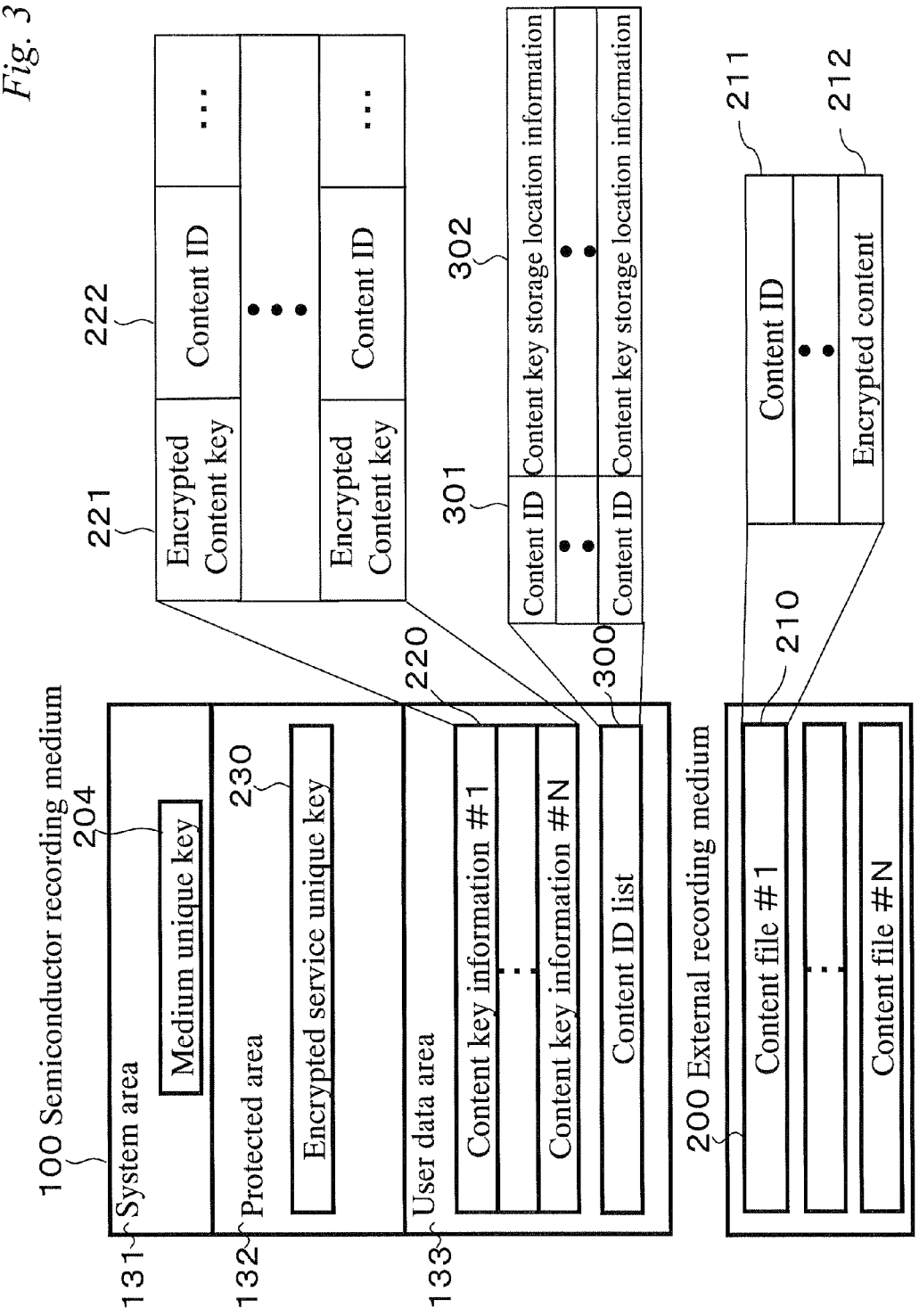
FIG. 3 is a diagram illustrating exemplary structures of content key information and a content file in a first embodiment of the present invention.

Next, FIG. 3 is a diagram illustrating the structures of information that is stored in the semiconductor recording medium 100 and the external recording medium 200 in accordance with a data storing method of the present embodiment. Unlike in the general storing method shown in FIG. 2, a content ID list 300 is stored in the user data area 133 of the semiconductor recording medium 100, along with the content key information 220.

The pieces #1 to #N of content key information 220 each contain entries at least including: a content key 221, which is encrypted; and a content ID 222, which is a value uniquely assigned to encrypted content, which is encrypted, in order to correlate the encrypted content key 202 with the content file 210 in a one-to-one relationship.

The content ID list 300 contains content IDs 301, and pieces of content key storage location information 302, each indicating where the encrypted content key 221 is stored. The content key storage location information 302 normally includes a directory name and a file name, by both of which the content key can be identified, or a file name and information concerning an index number within that file.

In the content ID list 300, the content IDs 301 are paired with the content key storage location information 302 in association with their respective pieces of content, and the content ID list 300 is sorted in accordance with the content IDs 301. Specifically, the content IDs 301 are listed in ascending or descending order of their values.

On the other hand, the external recording medium 200 has stored therein the #1 to #N content files 210, each including at least a content ID 211 and encrypted content 212, which is encrypted with a content key 202.

Of these pieces of information, if the content ID 222 stored within an entry of the content key information 220 has the same value as that of the content ID 211 stored in the content file 210, it means that the encrypted content key 221 is associated with the encrypted content 212.

Referring next to FIGS. 4 to 7, the configuration of a data recording device employing the data storing method according to the present embodiment will be described along with a process sequence in which the data recording device records content to the external recording medium 200.

Figure 4:
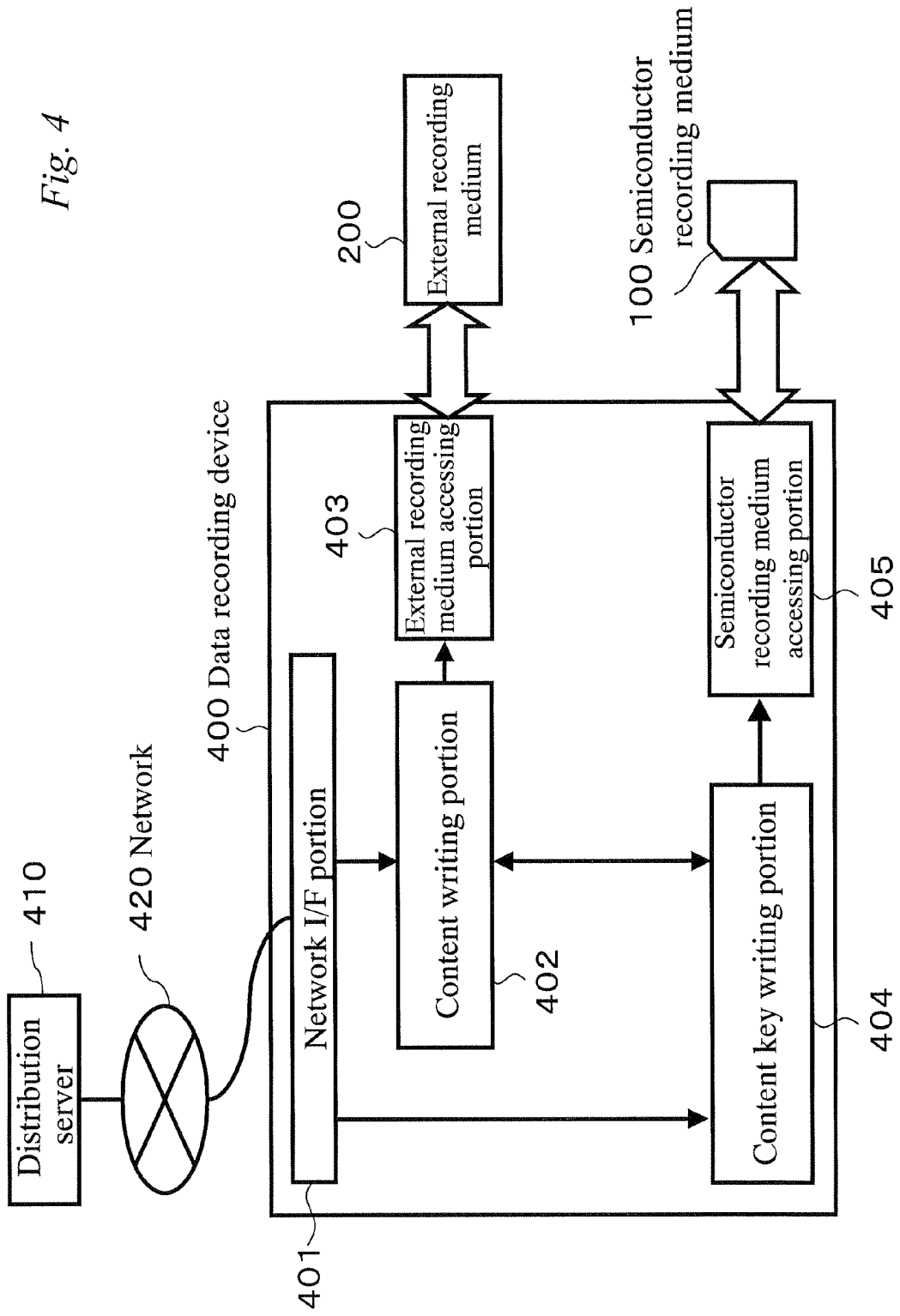
FIG. 4 is a diagram illustrating a configuration of a data recording device in the first embodiment of the present invention.

FIG. 4 is a diagram illustrating an exemplary configuration of the data recording device, which manages content using the content key information 220 and the content files 210 as described with respect to FIG. 3, and the data recording device acquires encrypted content and content keys from distribution servers via various networks such as Internet networks and cell phone networks.

The data recording device 400 includes a network I/F portion 401, a content writing portion 402, an external recording medium accessing portion 403, a content key writing portion 404, and a semiconductor recording medium accessing portion 405. The above components will be described below in terms of their functions.

The network I/F portion 401 is connected to a network 420, and receives content, a content key for encrypting the content, and a content ID uniquely assigned to the content from a distribution server 410 connected to the same network 420. As described earlier, the content distributed by the distribution server 410 is encrypted with a content key 202, and the content key 202 is encrypted with a service unique key 203 arbitrarily determined within a distribution service.

The content writing portion 402 writes the received encrypted content 212, along with a content ID 211 uniquely assigned thereto, to the external recording medium 200 via the external recording medium accessing portion 403. The external recording medium 200 is an external recording medium loaded into the data recording device 400, and has functions of reading and writing arbitrary digital data. Note that in the present embodiment, the external recording medium 200 is used as a medium for recording the content, but the content may be recorded to memory included in the data recording device 400, rather than to the external recording medium 200.

The external recording medium 200, such as an optical disk, is loaded into the external recording medium accessing portion 403, having a function of accessing the external recording medium 200 to write encrypted content 212, which is sent from the distribution server 410 by way of the network 420, to the external recording medium 200, and to read encrypted content 212 stored in the external recording medium 200.

The content key writing portion 404 has functions of: writing the content key information 220 (see FIG. 3), which contains the content ID 222 uniquely assigned to the content and the encrypted content key 221, to the semiconductor recording medium 100 via the semiconductor recording medium accessing portion 906; and extracting content IDs and their respective pieces of content key storage location information, each indicating where its corresponding encrypted content key 221 is stored, from the content key information 220, and generating a content ID list, in which these pieces of information are sorted in accordance with the content IDs, before writing the list to the semiconductor recording medium 100.

The semiconductor recording medium 100 is loaded into the semiconductor recording medium accessing portion 405, having a function of accessing the loaded semiconductor recording medium 100. Specifically, an authentication process is performed, which is required for reading the medium unique 204 key stored in the system area 131 of the semiconductor recording medium 100, and reading digital data stored in the protected area 132 or writing digital data to the protected area 132.

Figure 5:
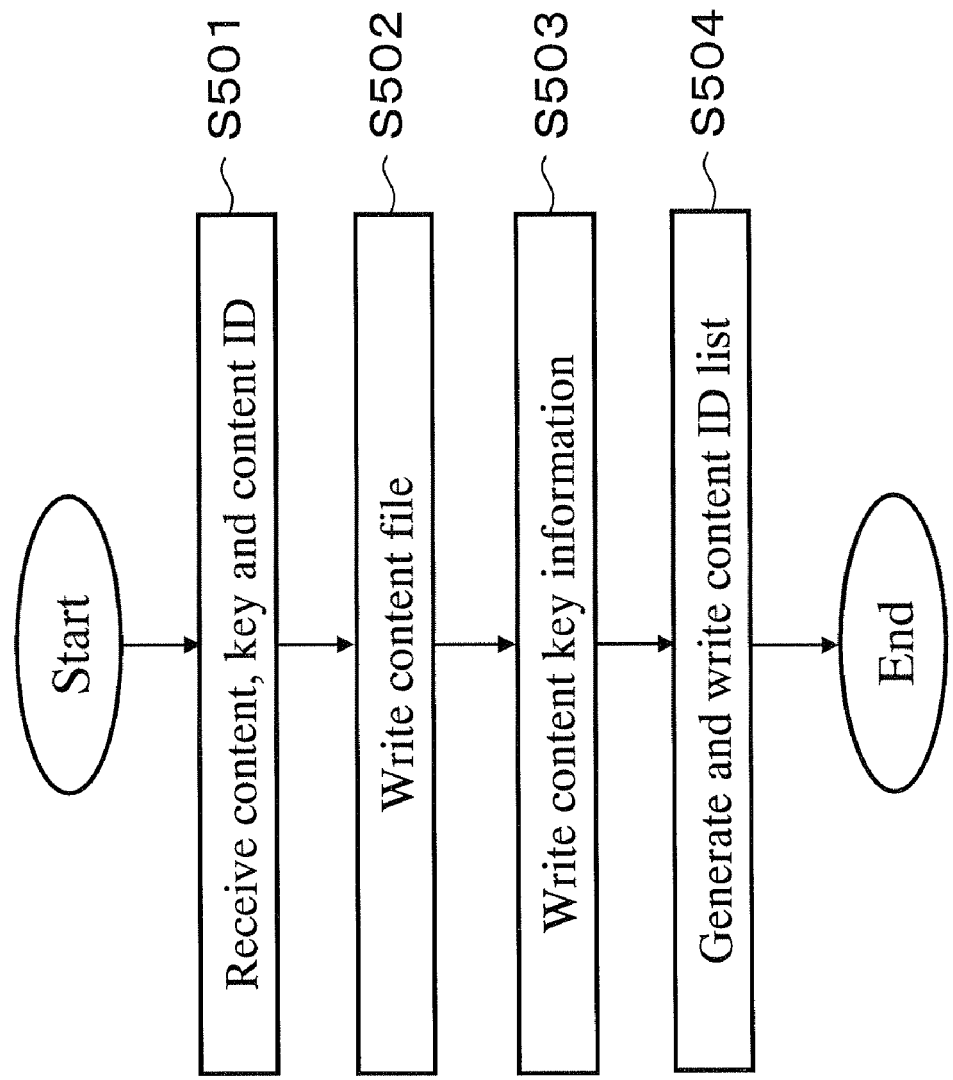
FIG. 5 is a flowchart illustrating an exemplary recording process sequence of the data recording device of FIG. 4.

FIG. 5 is a flowchart illustrating an exemplary process sequence in which encrypted content and an encrypted content key, which are received by the data recording device 400, are stored to the external recording medium 200 and the semiconductor recording medium 100, respectively.

To describe the flowchart of FIG. 5, first, the network I/F portion 401 receives encrypted content, an encrypted content key, and a content ID uniquely assigned to the content from the distribution server 410 via the network 420 (S501). The content distributed by the distribution server 410 is encrypted with the content key, and the content key is encrypted with the aforementioned service unique key, which is arbitrarily determined within the distribution service.

Next, the content writing portion 402 writes a content file, which contains the received content ID and encrypted content, to the external recording medium 903 via the external recording medium accessing portion 403 (S502).

Next, the content key writing portion 404 generates content key information 220, which contains the received content ID and encrypted content key, and writes the generated information to the user data area 133 of the semiconductor recording medium 100 via the semiconductor recording medium accessing portion 405 (S503).

In addition, the content key writing portion 404 extracts the content ID and content key storage location information from the content key information to generate a content ID list 300, which is sorted by content ID, and writes the generated list to the user data area 133 of the semiconductor recording medium 100 via the semiconductor recording medium accessing portion 405 (S504).

Note that as shown in FIG. 2, the service unique key 203 is stored in the semiconductor recording medium 100 after being encrypted with the medium unique key 204, and therefore it is necessary to read the encrypted service unique key 230 and the medium unique key 204, and calculate a plaintext service unique key 203. The reading of the medium unique key 204 from the system area 131, the reading of the encrypted service unique key 230 from the protected area 132 and the writing of the encrypted service unique key 230 to the protected area 132 are made possible as a result of mutual validity authentication between the semiconductor recording medium accessing portion 405 and the semiconductor recording medium 100. The authentication between the semiconductor recording medium accessing portion 405 and the semiconductor recording medium 100 is a generally known technique, and therefore the description thereof will be omitted herein.

In addition, although not shown in FIG. 5, the content writing portion 402 has a general function of generating a playlist, which is a list of content files stored in the external recording medium 200, and the playlist is generated after the completion of step S502, and stored to the external recording medium 200, along with the content files.

Figure 6:
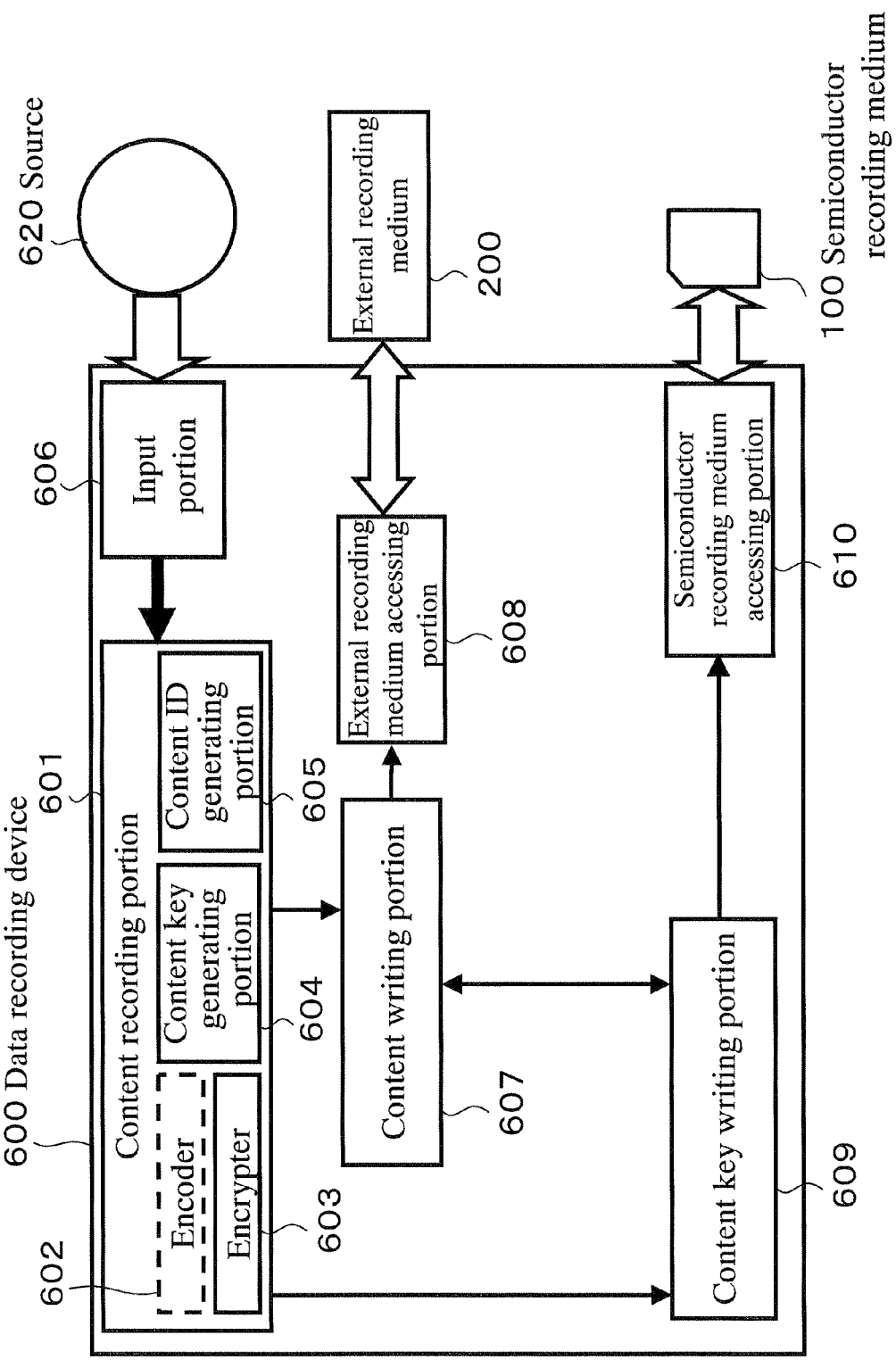
FIG. 6 is a diagram illustrating a configuration of a data recording device in the first embodiment of the present invention.

Next, FIG. 6 is a diagram illustrating an exemplary configuration of a local-content-compatible data recording device 600 for recoding content recorded in a CD, a DVD or the like, i.e., local content, to the semiconductor recording medium 100 without involving any network.

The data recording device 600 includes a content recording portion 601, an input portion 606, a content writing portion 607, an external recording medium accessing portion 608, a content key writing portion 609, and a semiconductor recording medium accessing portion 610. The above components will be described below in terms of their functions.

The content recording portion 601 has a function of generating the content key and the content ID as well as a function of generating the encrypted content from inputted local content, and includes an encoder 602, an encrypter 603, a content key generating portion 604, and a content ID generating portion 605.

The encoder 602 has a function of encoding local content inputted from the input portion 606, thereby subjecting the content to data compression. The encoder 602 is not always necessary, but in the present embodiment, the inputted local content is compressed by the encoder 602 before being encrypted by the encrypter 603.

The encrypter 603 encrypts the local content with a content key generated by the content key generating portion 604, thereby generating encrypted content.

The content key generating portion 604 generates a content key for use in encrypting the local content inputted from the input portion 606. In the present embodiment, the content key generating portion 604 includes a random number generator, and generates a random number as a content key.

The content ID generating portion 605 generates a content ID, which is a value unique to the encrypted content.

The input portion 606 receives local content from the source 620, such as a CD or a DVD, which has the local content stored therein.

The content writing portion 607 has a function similar to that of the content writing portion 402 in FIG. 4, and writes the encrypted content to the external recording medium 200 via the external recording medium accessing portion 608, along with the content ID generated by the content ID generating portion 605 of the content recording portion 601. Note that the content may be stored to internal memory, rather than to the external recording medium 200.

The external recording medium accessing portion 608 has a function similar to that of the external recording medium accessing portion 403 in FIG. 4, and accesses the external recording medium 200, such as an optical disk, which is loaded thereinto.

The content key writing portion 609 has functions similar to those of the content key writing portion 404 in FIG. 4, and writes the content ID and the encrypted content key, which are generated by the content recording portion 601, to the semiconductor recording medium 100 via the semiconductor recording medium accessing portion 610.

The semiconductor recording medium accessing portion 610 has a function similar to that of the semiconductor recording medium accessing portion 405 in FIG. 4, and accesses the semiconductor recording medium 100, which is loaded thereinto.

Figure 7:
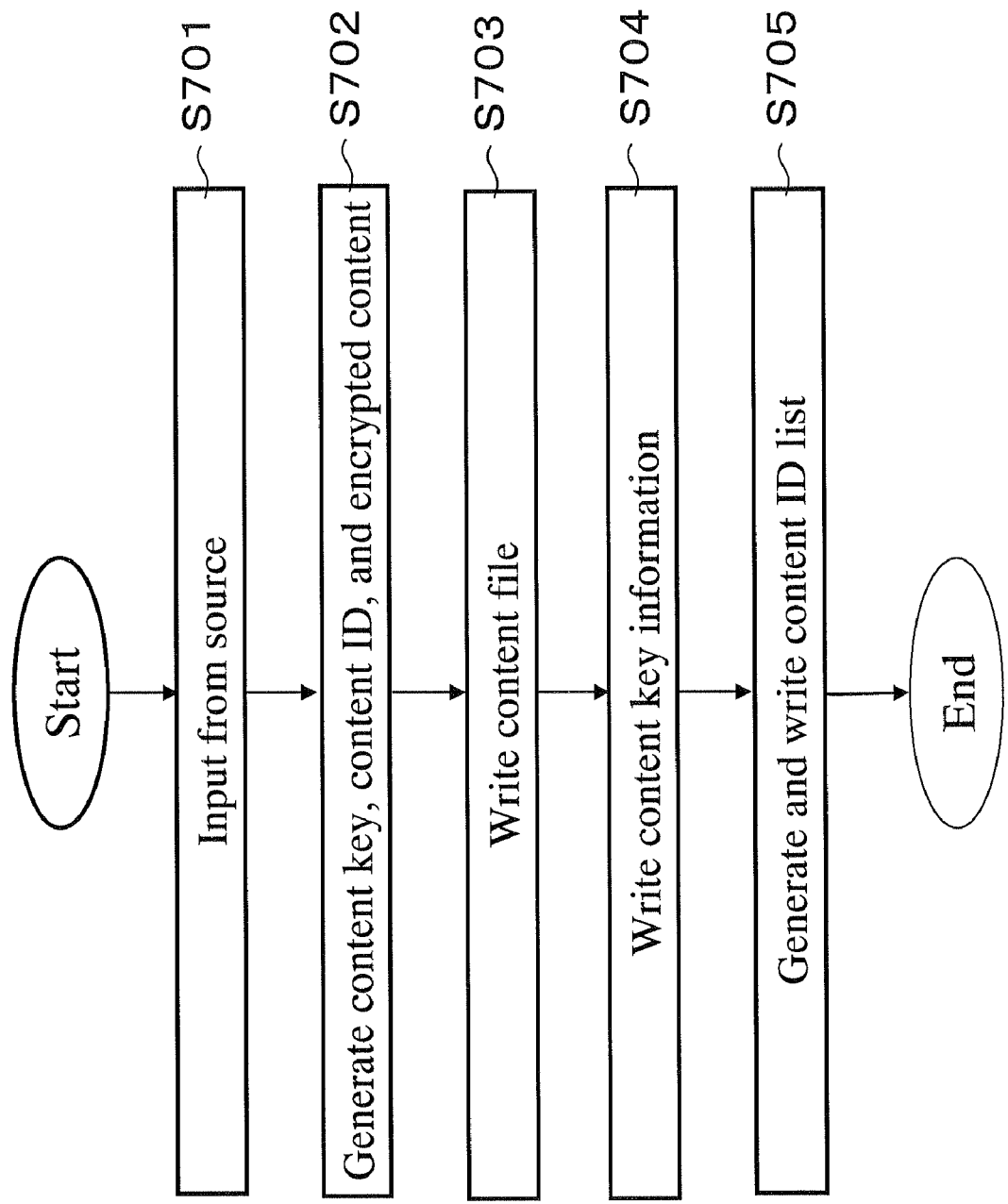
FIG. 7 is a flowchart illustrating an exemplary process sequence of the data recording device of FIG. 6.

FIG. 7 is a flowchart illustrating an exemplary process sequence in which the local-content-compatible data recording device 600 stores local content, which is acquired from the source 620 via the input portion 606, to the external recording medium 200.

To describe the flowchart of FIG. 7, first, the input portion 606 of the data recording device 600 acquires local content from the source 620, which is a recording medium, such as a CD or a DVD, or an input device, such as a camera or a microphone. The acquired local content is passed to the content recording portion 601 (S701).

In the content recording portion 601, the encoder 602 encodes the local content, thereby subjecting the content to data compression. Furthermore, a content key and a content ID are respectively generated by the content key generating portion 604 and the content ID generating portion 605, and the encrypter 603 encrypts the encrypted local content with the content key, thereby generating encrypted content (S702).

Next, the content writing portion 607 writes to the external recording medium 200 a content file containing the content ID generated by the content ID generating portion 605 of the content recording portion 601 and the content encrypted by the encrypter 603 (S703). Thereafter, in a manner as described with respect to FIG. 5, the content writing portion 607 generates a playlist, and stores it along with the content file to the external recording medium 200 (not shown).

Next, the content key writing portion 609 writes content key information 220, which contains the content ID generated by the content ID generating portion 605 of the content recording portion 601 and an encrypted content key 221 encrypted with a service unique key 203 stored in the protected area 132 of the semiconductor recording medium 100, to the user data area 133 of the semiconductor recording medium 100 via the semiconductor recording medium accessing portion 610 (S704).

In addition, the content key writing portion 609 extracts a content ID and content key storage location information from the content key information 220 to generate a content ID list 300, which is sorted by content ID, and writes the generated list to the user data area 133 of the semiconductor recording medium 100 via the semiconductor recording medium accessing portion 405 (S705).

Note that as described earlier, the semiconductor recording medium accessing portion 610 performs an authentication process required for reading the medium unique key 204 stored in the system area 131 of the semiconductor recording medium 100 as well as reading the encrypted service unique key 230 stored in the protected area 132.

Thereafter, in a manner as described earlier, the content writing portion 607 generates a playlist, and stores it to the external recording medium 200, along with the content file.

As described above, the distribution-content-compatible data recording device 400 and the local-content-compatible data recording device 600 store, respectively for the distribution content and the local content, the content key information and the content ID list to the semiconductor recording medium 100 in accordance with the storing method as shown in FIG. 3.

Figure 8:
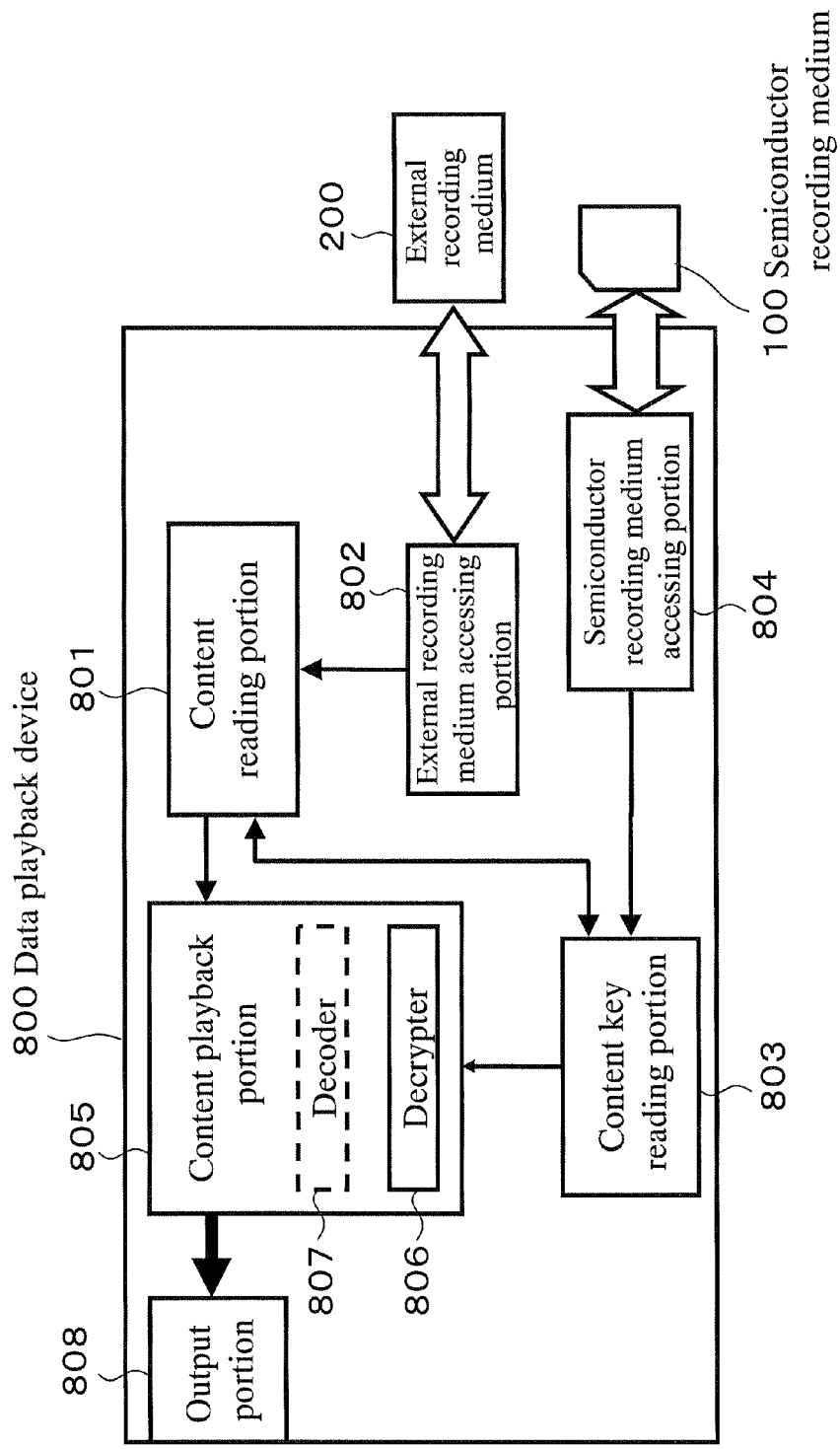
FIG. 8 is a diagram illustrating a configuration of a data playback device in the first embodiment of the present invention.
Figure 9:
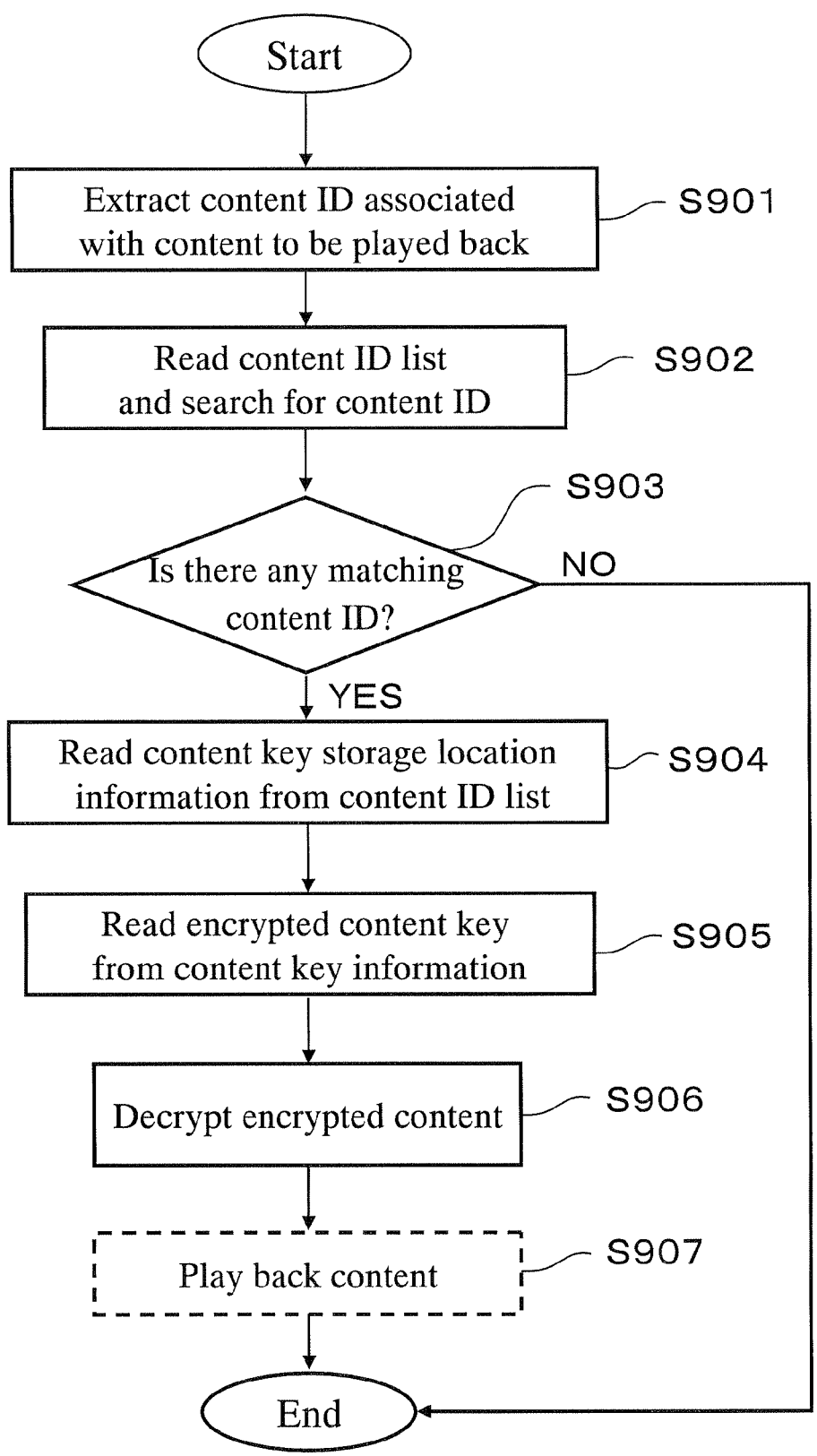
FIG. 9 is a flowchart illustrating an exemplary process sequence of the data playback device of FIG. 8.

Referring next to FIGS. 8 and 9, the configuration of a data playback device employing a data playback method according to the present embodiment will be described along with a process sequence in which the data playback device plays back content.

FIG. 8 is a diagram illustrating an exemplary configuration of the data playback device 800. The playback device 800 includes a content reading portion 801, an external recording medium accessing portion 802, a content key reading portion 803, a semiconductor recording medium accessing portion 804, a content playback portion 805 and an output portion 808. These components will be described below in terms of their functions.

The content reading portion 801 designates a content file that is to be played back based on a known playlist or suchlike from among content files 210 stored in the external recording medium 200, and reads the appropriate content file.

Also, the content reading portion 801 refers to a content ID in the content ID list 300, which is read from the semiconductor recording medium 100 onto the content key reading portion 801, and searches for an encrypted content key corresponding to the content file 210 that is to be played back.

The external recording medium accessing portion 802 accesses the external recording medium 200, such as an optical disk, which is loaded thereinto.

The content key reading portion 803 reads content key information 220 and the content ID list 300, which are stored in the semiconductor recording medium 100, via the semiconductor recording medium accessing portion 804, and thereafter passes the content ID list 300 to the content reading portion 801, and in addition, the content key reading portion 803 decrypts an encrypted content key 221 read from the semiconductor recording medium 100, and passes a plaintext content key 202 to the content playback portion 805.

The semiconductor recording medium accessing portion 804 accesses the semiconductor recording medium 100, which is loaded thereinto. Also, the semiconductor recording medium accessing portion 804 performs an authentication process required for reading a medium unique key 204 stored in the system area 131 of the semiconductor recording medium 100, and reading an encrypted service unique key 230 stored in the protected area 132.

The content playback portion 805 decrypts encrypted content 212 received from the content reading portion 801 with the content key 202 received from the content key reading portion 801, and thereafter performs data decompression as necessary to play back the content. The content playback portion 805 includes a decrypter 806 and a decoder 807.

The decrypter 806 performs a process for decrypting the encrypted content 212 with the content key 202. In the case where the content decrypted by the decrypter 806 has been subjected to data compression, the decoder 807 performs a process for performing data decompression to restore the content to its precompressed state. Note that the decoder 807 is dispensable when the content is not subjected to data compression.

The output portion 808 outputs the content decoded by the content playback portion 805. The output portion 808 is implemented by a display when the content is video data, or by loudspeakers in the case of audio data. In addition, in the case of using a display or loudspeakers, which are external to the data playback device 800, the output portion is implemented by an output terminal such as an AV-OUT.

FIG. 9 is a flowchart illustrating an exemplary process sequence in which the data playback device 800 plays back content stored in the external recording medium 200.

To describe the flowchart of FIG. 9 with reference to FIGS. 3 and 8, first, the content reading portion 801 reads a playlist, which is stored in the external recording medium 200, along with content files 210, thereby designating a content file 210 that is to be played back, and extracts a content ID from that file (S901).

Next, the content key reading portion 801 reads the content ID list 300 from the semiconductor recording medium 100 via the semiconductor recording medium accessing portion 804, and transfers it to the content reading portion 801, and the content reading portion 801 searches the read content ID list 300 to find out whether there is any content ID that matches the content ID 222 of the appropriate content file 210 (S902). As described earlier, the content ID list 300 is sorted by content ID, and therefore the content reading portion 801 can instantly find a content ID 301 that matches the content ID 211 of the content file 210.

If the content ID list 300 does not contain any content ID 301 that matches the content ID 211 of the content file 210 (NO in S903), the procedure is terminated, whereas if there is a matching content ID 301 (YES in S903), then corresponding content key storage location information 302 is read from the content ID list 300 (S904).

Next, based on the content key storage location information 302, the content key reading portion 801 reads an encrypted content key 221 from the content key information 220 stored in the user data area 133 of the semiconductor recording medium 100 (S905).

As described with respect to FIG. 2, the read encrypted content key 221 is encrypted with the service unique key 203, and therefore the content key reading portion 801 reads the service unique key 203 stored in the protected area 132 of the semiconductor recording medium 100 via the semiconductor recording medium accessing portion 804, and decrypts the encrypted content key with the service unique key 203, thereby generating a plaintext content key 202. However, the service unique key 203 is stored after being encrypted with the medium unique key 204 stored in the system area 131 of the semiconductor recording medium 100, and therefore it is necessary to read the encrypted service unique key 230 and the medium unique key 204, and calculate a plaintext service unique key 203.

Note that as in the case of the data recording device, the reading of the medium unique key 204 and the reading of the encrypted service unique key 230 are made possible as a result of mutual validity authentication between the semiconductor recording medium accessing portion 804 and the semiconductor recording medium 100.

The plaintext content key 202 thus obtained is passed to the content playback portion 805. In the content playback portion 805, the decrypter 806 decrypts the encrypted content 212 with the content key 202 acquired from the content key reading portion 803 (S906). Furthermore, the decoder 807 performs data decompression on the decrypted content, which is passed to the output portion 808 for playback (S907).

As described above, the content ID list containing the content storage location information is used to correlate content keys with their respective pieces of encrypted content, thereby making it possible to significantly increase the speed of searching for a content key required for content playback.

Second Embodiment

While the first embodiment has been described with respect to the case where the content ID list is saved in the semiconductor recording medium 100, the present embodiment will be described with respect to the case where the content ID list is saved in the external recording medium 200.

Figure 10:
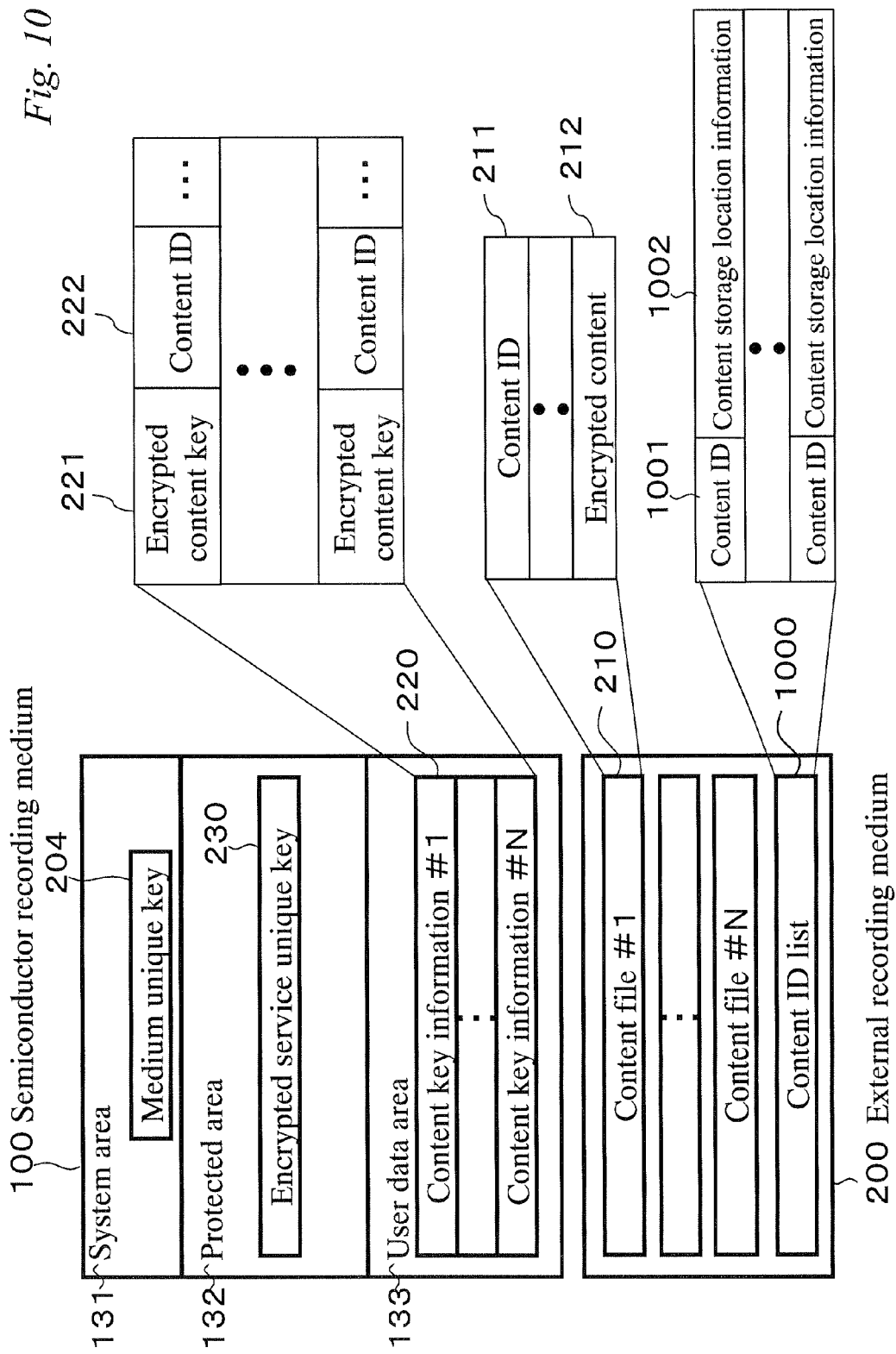
FIG. 10 is a diagram illustrating exemplary structures of content key information and a content file in a second embodiment of the present invention.

FIG. 10 is a diagram illustrating the structures of information that is stored in the semiconductor recording medium 100 and the external recording medium 200 in accordance with a data storing method of the present embodiment. Unlike in FIG. 3 illustrating the structures of information in the first embodiment, a content ID list 1000 is stored in the external recording medium 200, along with content files 210. In addition, unlike the content ID list 300 in the first embodiment, the content ID list 1000 contains content IDs 1001 and content storage location information 1002, which is information indicating where encrypted content 212 is stored. Note that the list is sorted in accordance with the content IDs 1001 as in the case of the content ID list 300.

A data recording device 400, 600, and a data playback device 800, which respectively carry out a data storing method and a data playback method in accordance with the present embodiment, are basically configured in the same manner as in the first embodiment, except that content writing portions 402 and 607 and a content reading portion 801 function in a slightly different manner from their counterparts.

In the first embodiment, the content ID 211 of the content file 210 that is to be played back is identified, the content key storage location information 302 corresponding thereto is found in the content ID list 300 stored in the semiconductor recording medium 100, and a known playlist stored in the external recording medium 200 is used as a means for identifying the content file 210. However, the present embodiment employs a method in which content storage location information 1002 of an encrypted content 212 that is to be played back is found in the content ID list 1001 stored in the external recording medium 200. Accordingly, it is necessary to identify the content ID 211 of the content file 210 that is to be played back, using content key information 220 stored in the semiconductor recording medium 100. However, the known playlist is generated based on information in the content file 210 stored in the external recording medium 200, and therefore without any modification, it is not possible to identify the content ID of the content file 210 that is to be played back, using the content key information 220 stored in the semiconductor recording medium 100.

Therefore, it is necessary to process the playlist before finding the corresponding content storage location information 1002 in the content ID list 1000 stored in the external recording medium 200. Specifically, the content reading portion 801 of the data playback device 800 (see FIG. 8) reads the playlist stored in the external recording medium 200, while instructing the content key reading portion 803 to read the content key information 220 stored in the semiconductor recording medium 100, and generates a new playlist for content files 210 associated with the same content ID.

Hereinbelow, a process sequence of the data storing method in the present embodiment will be described with reference to FIGS. 11 and 12, and a process sequence of the data playback method in the present embodiment will be described with reference to FIG. 13.

Figure 11:
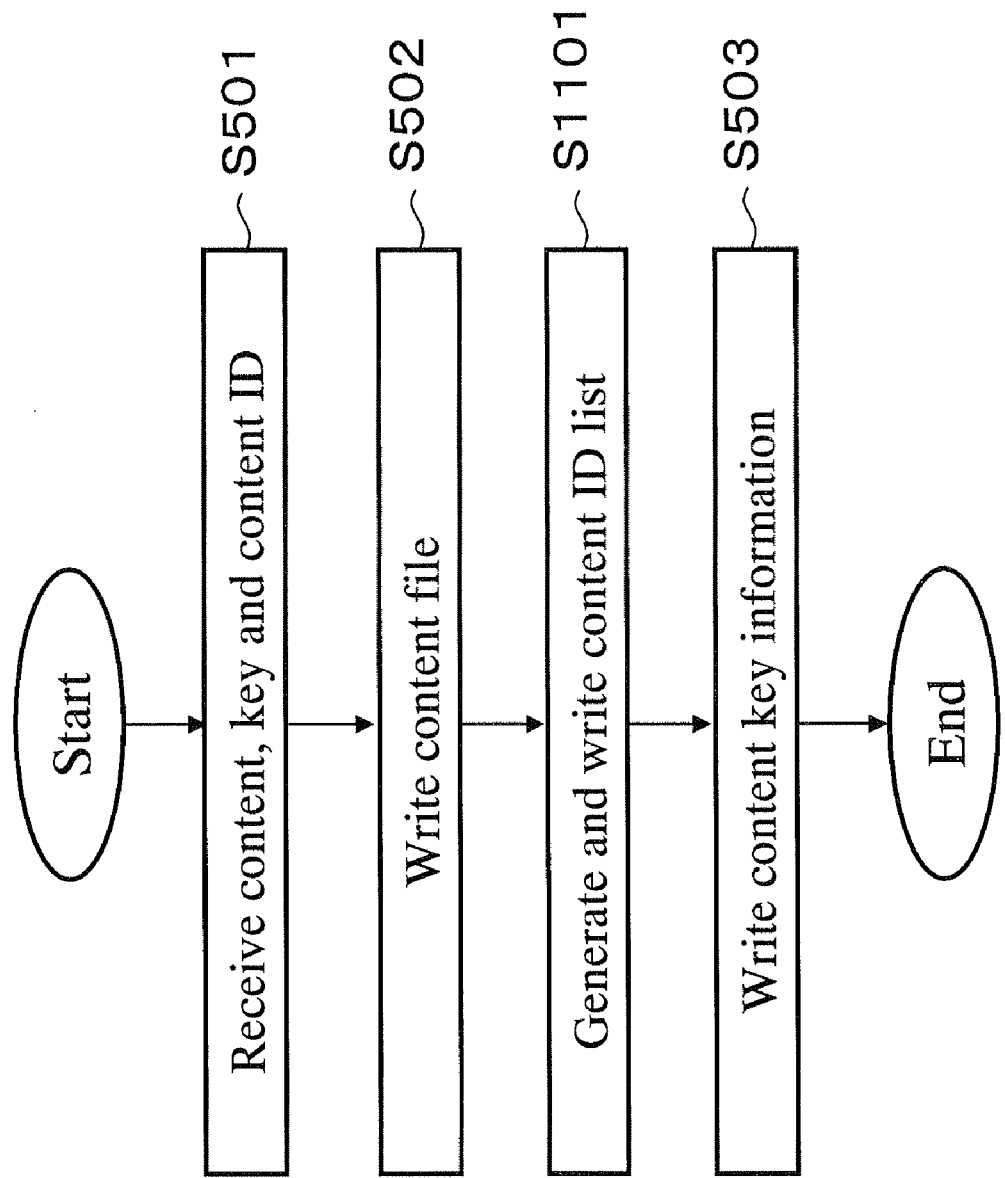
FIG. 11 is a flowchart illustrating an exemplary process sequence of a data recording device in the second embodiment of the present invention.

FIG. 11 is a flowchart illustrating an exemplary process sequence in which the distribution-content-compatible data recording device 400 shown in FIG. 4 stores distribution content, which is acquired from the distribution server 410 via the network I/F portion 401, to the external recording medium 200.

In this figure, the same steps as those in the flowchart of FIG. 5 are denoted by the same characters. A difference from the process sequence shown in FIG. 5 is that after writing the content file to the external recording medium 200 (S502), the content writing portion 402 generates the content ID list 1000 as shown in FIG. 10, and stores it to the external recording medium 200 (S1101). Note that, as might be expected, that step S504 of FIG. 5, where the content ID list 300 is written to the semiconductor recording medium 100, is deleted.

Figure 12:
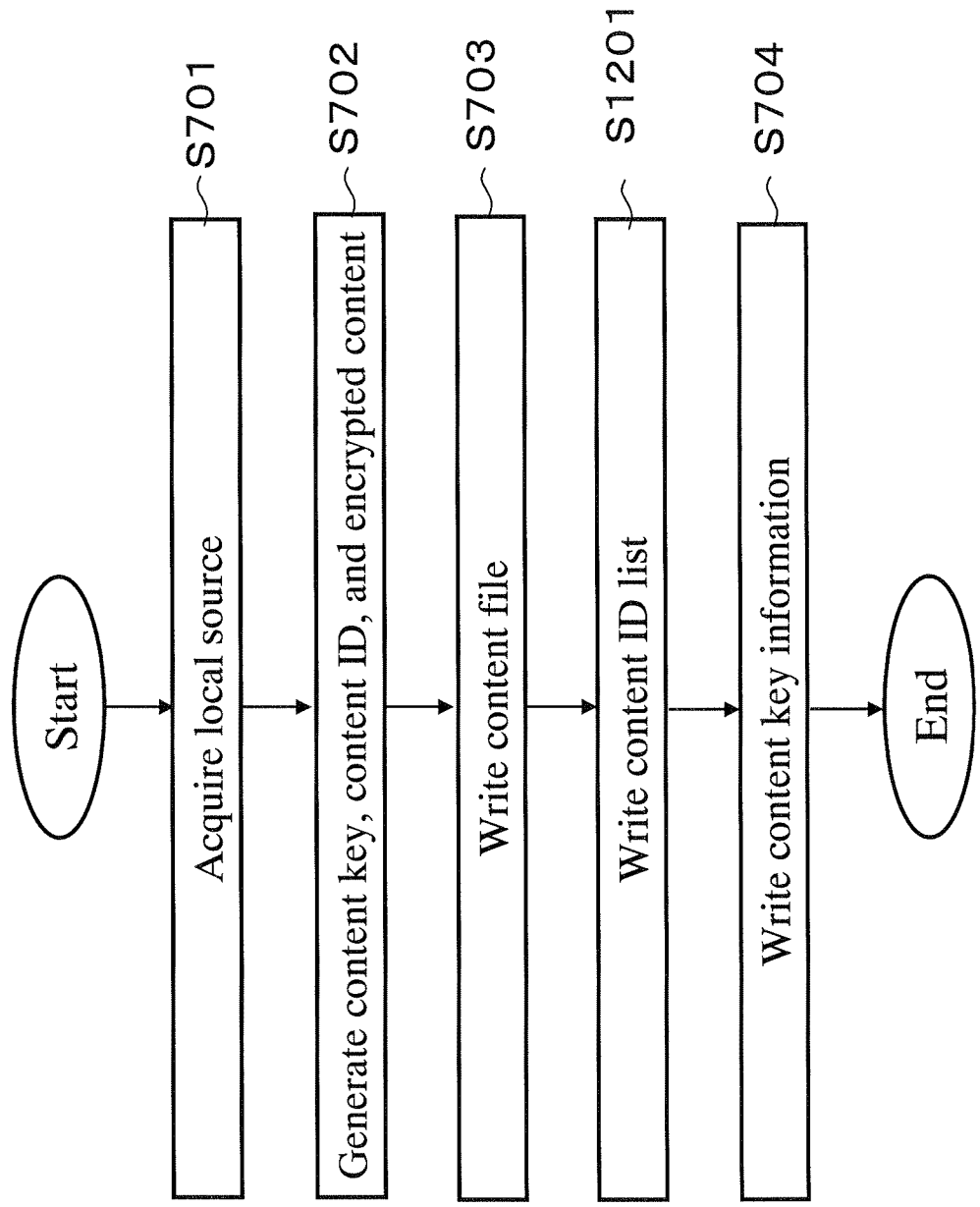
FIG. 12 is a flowchart illustrating an exemplary process sequence of a data recording device in the second embodiment of the present invention.

On the other hand, FIG. 12 is a flowchart illustrating an exemplary process sequence in which the local-content-compatible data recording device 600 shown in FIG. 6 stores local content, which is acquired from the source 620 via the input portion 606, to the external recording medium 200.

In this figure, the same steps as those in the flowchart of FIG. 7 are denoted by the same characters. A difference from the process sequence shown in FIG. 7 is that after writing the content file to the external recording medium 200 (S703), the content writing portion 601 generates the content ID list 1000 as shown in FIG. 10, and stores it to the external recording medium 200 (S1201). Note that step S705 of FIG. 7, where the content ID list 300 is written to the semiconductor recording medium 100, is deleted as in the case of FIG. 11.

Figure 13:
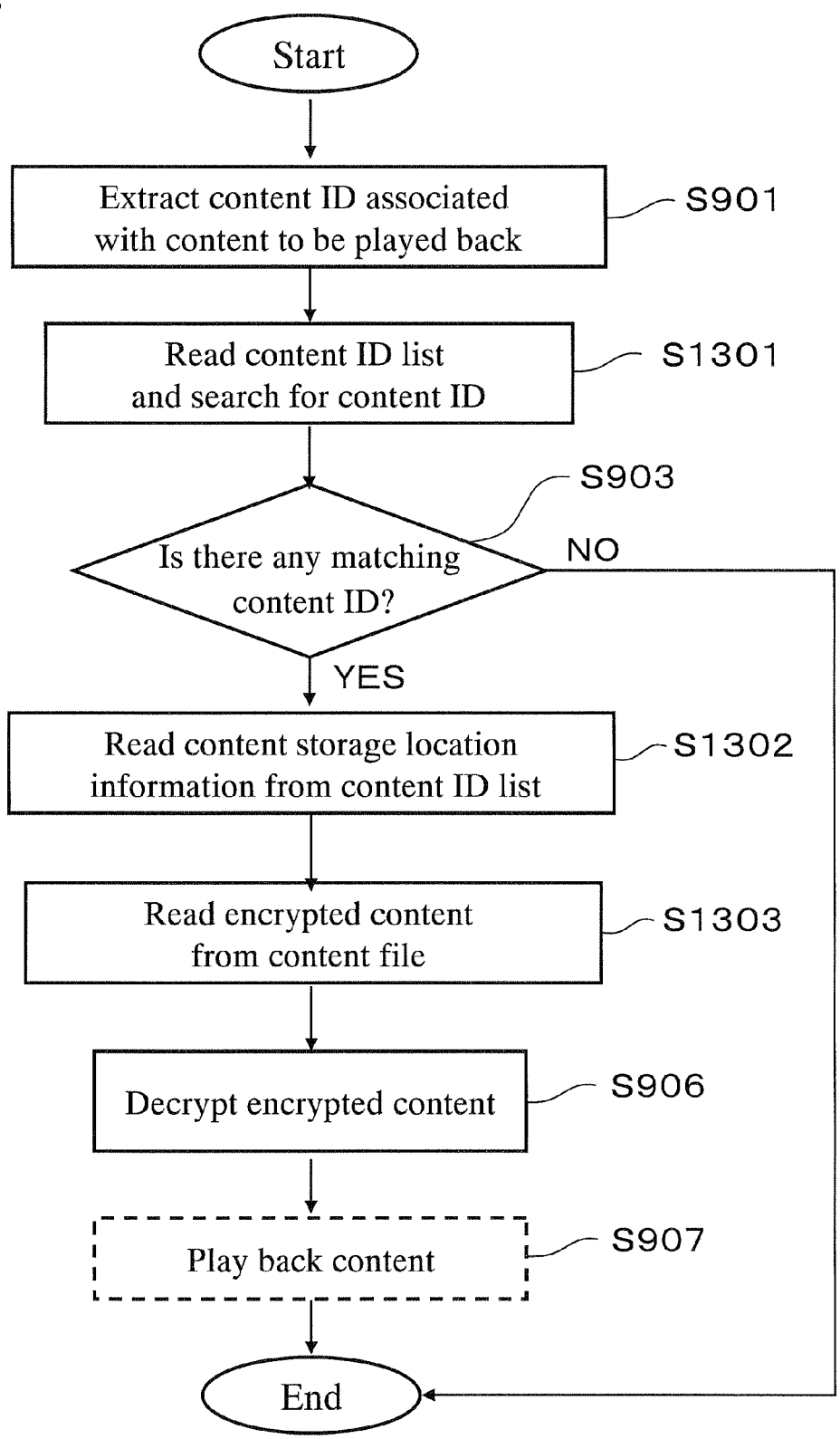
FIG. 13 is a flowchart illustrating an exemplary process sequence of a data playback device in the second embodiment of the present invention.

Next, FIG. 13 is a flowchart illustrating an exemplary process sequence in which the data playback device 800 plays back content stored in the external recording medium 200.

In this figure, the same steps as those in the flowchart of FIG. 9 are denoted by the same characters. Differences from the process sequence shown in FIG. 9 are steps S1301 to S1303. In step S902 of FIG. 9, the content ID list 300 stored in the semiconductor recording medium 100 is read to find the content ID 301 that matches the content ID 211 of the content file 210 that is to be played back, whereas in step S1301, the content ID list 1000 stored in the external recording medium 200 is read to find the content ID 1001 that matches the content ID 211 of the encrypted content 212 that is to be played back.

Also, in steps S904 and S905 of FIG. 9, the content key storage location information 302 associated with the encrypted content 212 that is to be played back is read from the content ID list 300, and based on this information, the encrypted content key 221 is read from the content key information 220 stored in the semiconductor recording medium 100, whereas in S1302 and S1303, the content storage location information 1002 of the encrypted content 212 that is to be played back is read from the content ID list 1000, and based on this information, the encrypted content 212 is read from the content file 210 stored in the external recording medium 200.

In this manner, the content ID list containing the content storage location information is used to correlate pieces of encrypted content with their respective content keys, thereby making it possible to significantly increase the speed of searching for encrypted content required for content playback.

Although not shown in the figures, a file for the content ID list may be further contained in the semiconductor recording medium as in the first embodiment.

Third Embodiment

While the first embodiment has been described with respect to the case where the content ID list 300 is stored in the semiconductor recording medium 100, and the second embodiment has been described with respect to the case where the content ID list 1000 is stored in the external recording medium 200, the present embodiment will be described with respect to the case where both the lists are stored in the semiconductor recording medium 100, along with the content files.

Figure 14:
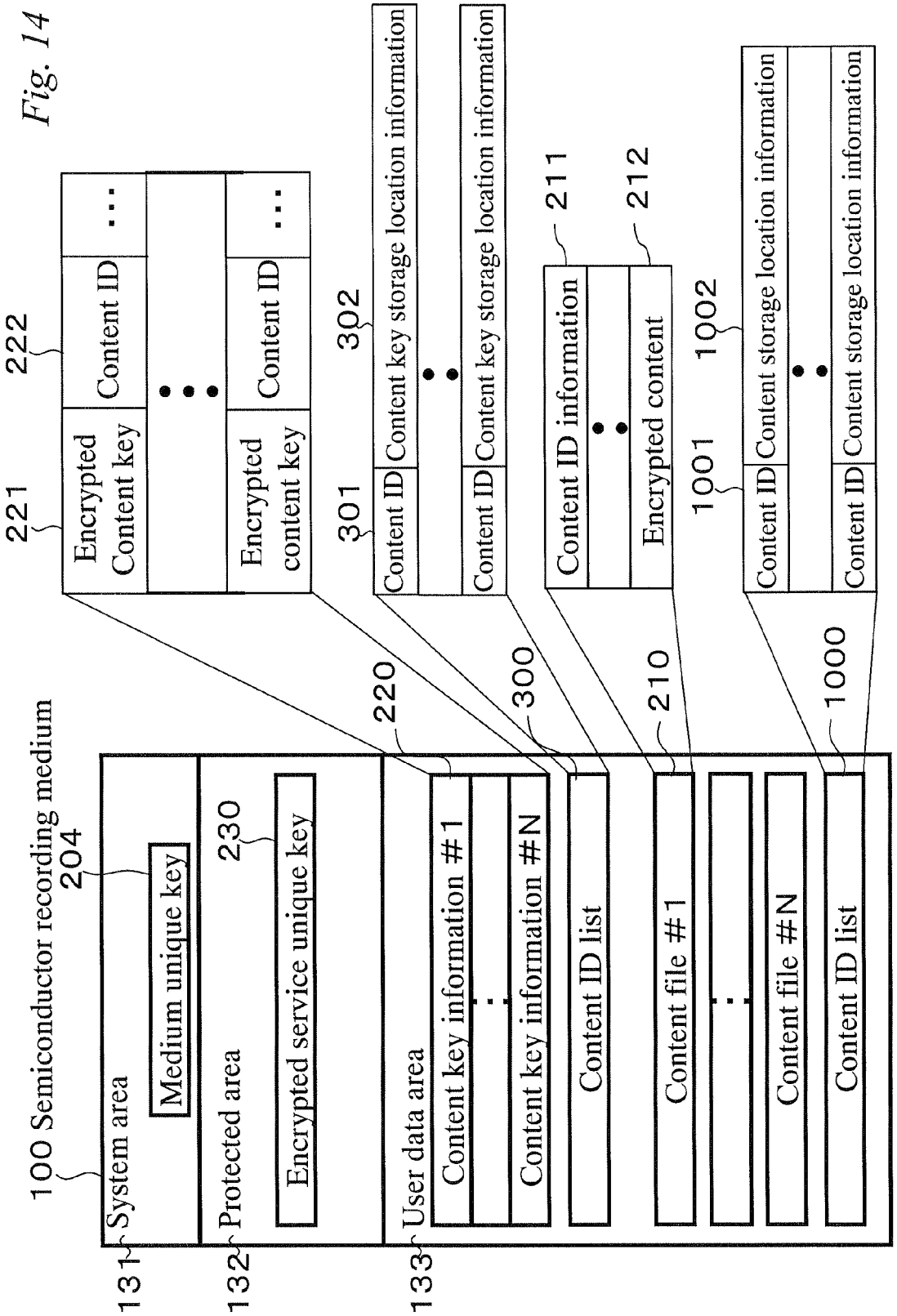
FIG. 14 is a diagram illustrating exemplary structures of content key information and a content file in a third embodiment of the present invention.

FIG. 14 is a diagram illustrating the structures of information stored in the semiconductor recording medium 100 in accordance with a data storing method of the present embodiment. In the present embodiment, all information, including the content files 210, is stored in the semiconductor recording medium 100. As in the first embodiment, the content ID list 300 contains the content IDs 301 and the content key storage location information 302. Also, as in the second embodiment, the content ID list 1000 contains the content IDs 1001 and the content storage location information 1002.

The data storing method in the present embodiment is basically the same as those described in the first and second embodiments, but differs in that the step of writing the content ID list to the semiconductor recording medium 100 is performed twice. Specifically, in the operational sequence of the data storing method, after the content file is written to the semiconductor recording medium, the content ID list 1000 is generated and stored to the semiconductor recording device 100, and furthermore, after the content key information is written to the semiconductor recording device 100, the content ID list 300 is generated and stored to the semiconductor recording device 100.

In addition, the data recording device and the data playback device used in the present embodiment are configured in the same manner as the data recording devices and the data playback devices used in the first and second embodiments, except that the external recording medium accessing portion 403, 608, 802 and the semiconductor recording medium accessing portion 405, 610, 804 are integrated together. Therefore, the descriptions of the configuration and the operation of each device will be omitted.

When the content ID list 300 containing the content key storage location information 302 is used to search for the content ID as described in the first embodiment, the content ID 211 of the content file 210 that is to be played back is extracted based on a playlist stored in the semiconductor recording medium 100. On the other hand, when the content ID list 1000 containing the content storage location information 1002 is used to search for the content ID as described in the second embodiment, the playlist stored in the semiconductor recording medium 100 is read, and thereafter only content IDs 222 in common with the content key information 220 are extracted to generate a new playlist, which is in turn used to extract the content ID 211 of the content file 210 that is to be played back.

As described above, either of the content ID lists stored in the semiconductor recording medium 100 and respectively containing the content key storage location information and the content storage location information is used to correlate pieces of encrypted content with their respective content keys, thereby making it possible to quickly search for information required for content playback.

Fourth Embodiment

The content ID list is used as a means for correlating pieces of encrypted content with their respective content keys in the first through third embodiments, but in the present embodiment, the content key information stored in the semiconductor recording medium 100 includes information indicating where content is stored, or each content file stored in the external storage medium 200 includes information indicating where a content key is stored, so that pieces of encrypted content and their respective content keys are correlated with each other.

Figure 15:
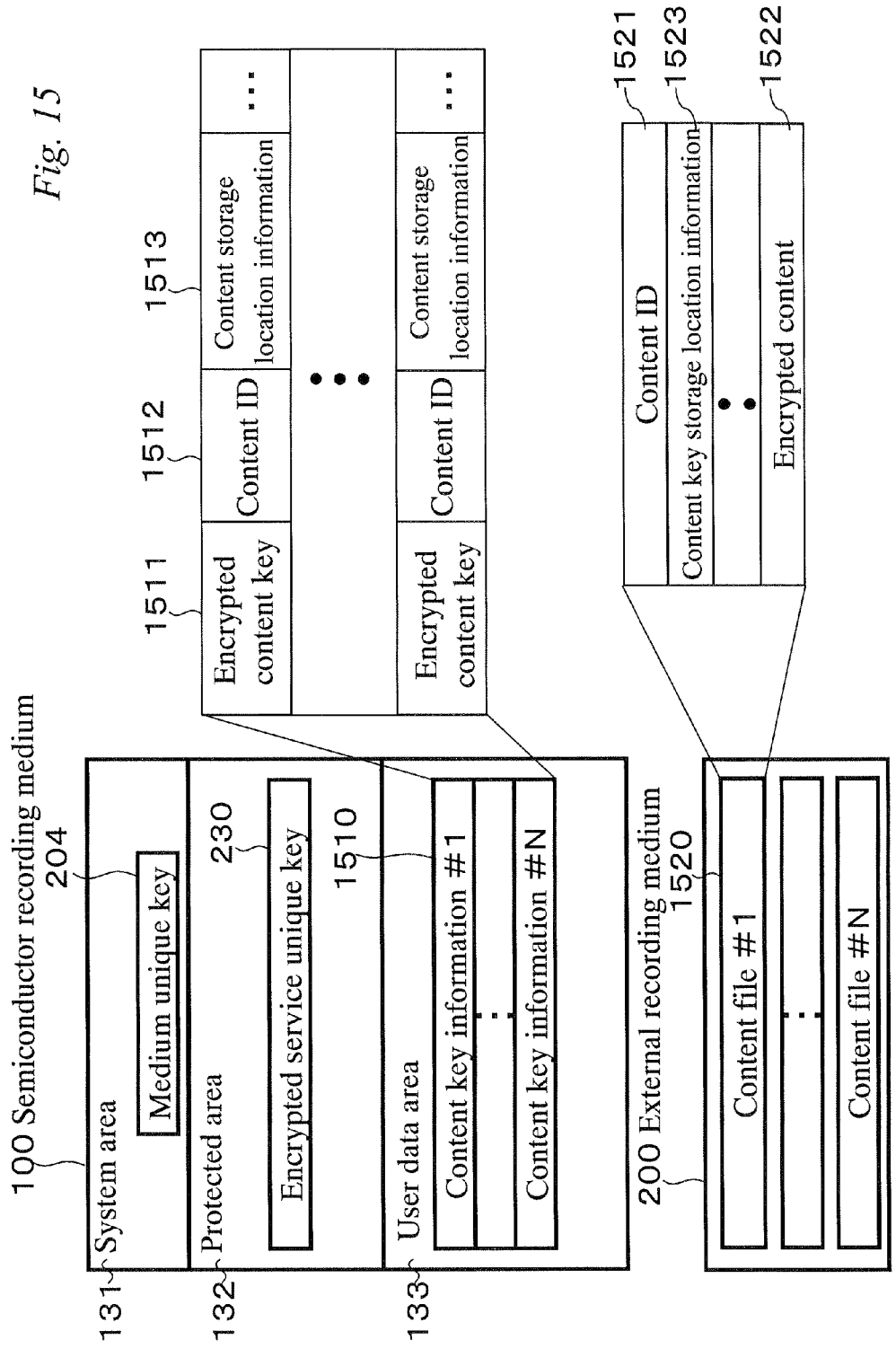
FIG. 15 is a diagram illustrating exemplary structures of content key information and a content file in a fourth embodiment of the present invention.

FIG. 15 is a diagram illustrating the structures of information stored in the semiconductor recording medium 100 and the external recording medium 200 in accordance with a data storing method of the present embodiment.

Content key information 1510 stored in the user data area 133 of the semiconductor recording medium 100 contains entries including: an encrypted content key 1511, a content ID 1512, and content storage location information 1513, which is information indicating where a content file corresponding to the encrypted content key 1511 is stored.

On the other hand, each content file 1520 stored in the external recording medium 200 contains a content ID 1521, encrypted content 1522, and content key storage location information 1523, which is information indicating where a content key corresponding to the encrypted content 1522 is stored.

Of the above-mentioned pieces of information, if the content ID 1512 stored within an entry of the content key information 1510 has the same value as that of the content ID 1521 stored in the content file 1520, it means that the encrypted content key 1511 is associated with the encrypted content 1522.

In the present embodiment, the encrypted content and the content key can be correlated with each other using either the content storage location information 1513 contained in the content key information 1510 or the content key storage location information 1523 contained in the content file 1520, but the following description will be directed to the case where the encrypted content and the content key are correlated together using the content storage location information 1513 contained in the content key information 1510.

FIG. 16(A) is a diagram illustrating in detail an exemplary structure of the content key information 1510. The content storage location information 1513 is composed of device information 1601, a directory name 1602, and a file name 1603.

The device information 1601 is information used for distinguishing whether the content storage location information 1503 can be read and used by a device. The directory name 1602 is information indicating the name of a directory in which the content file 1520 is stored. The file name 1603 is information indicating a file name of the content file 1520.

FIG. 16(B) is a diagram illustrating a concrete example of the content storage location information 1513. A code "ABC123" is stored as the device information 1601. Accordingly, any device having read this information determines based on the device information "ABC123" whether the directory name 1602 and the file name 1603 can be distinguished as the content storage location information.

When it is determined based on the device information 1601 that the content storage location information 1513 can be distinguished, for example, "3" and "4" are used as the directory name and the file name, respectively, to search for the fourth file in the third directory.

While FIGS. 16(A) and 16(B) illustrate an example as described above where the content storage location information 1513 contains the directory name 1602 and the file name 1603, FIGS. 17(A) and 17(B) illustrate an example where the content storage location information 1513 contains a content storage location path name 1702.

A code "123ABC" is stored as device information 1701. Accordingly, any device having read this information determines based on the device information "123ABC" whether the device can distinguish the path name 1702 as the content storage location information 1513. When it is determined based on the device information 1701 that the device can distinguish the content storage location information 1513, "¥Content¥Dir1¥File1" is used as the content storage location path name 1702 to search for the encrypted content 1511, thereby making it possible to perform high-speed search for encrypted content that is to be played back.

In the key-separation-type content management method, it is possible that the content storing method varies from one device to another, but by providing a region for the device information within the content storage location information 1513, it becomes possible to flexibly change the structure and interpretation of the content storage location information 1513 in accordance with each device.

Figure 18:
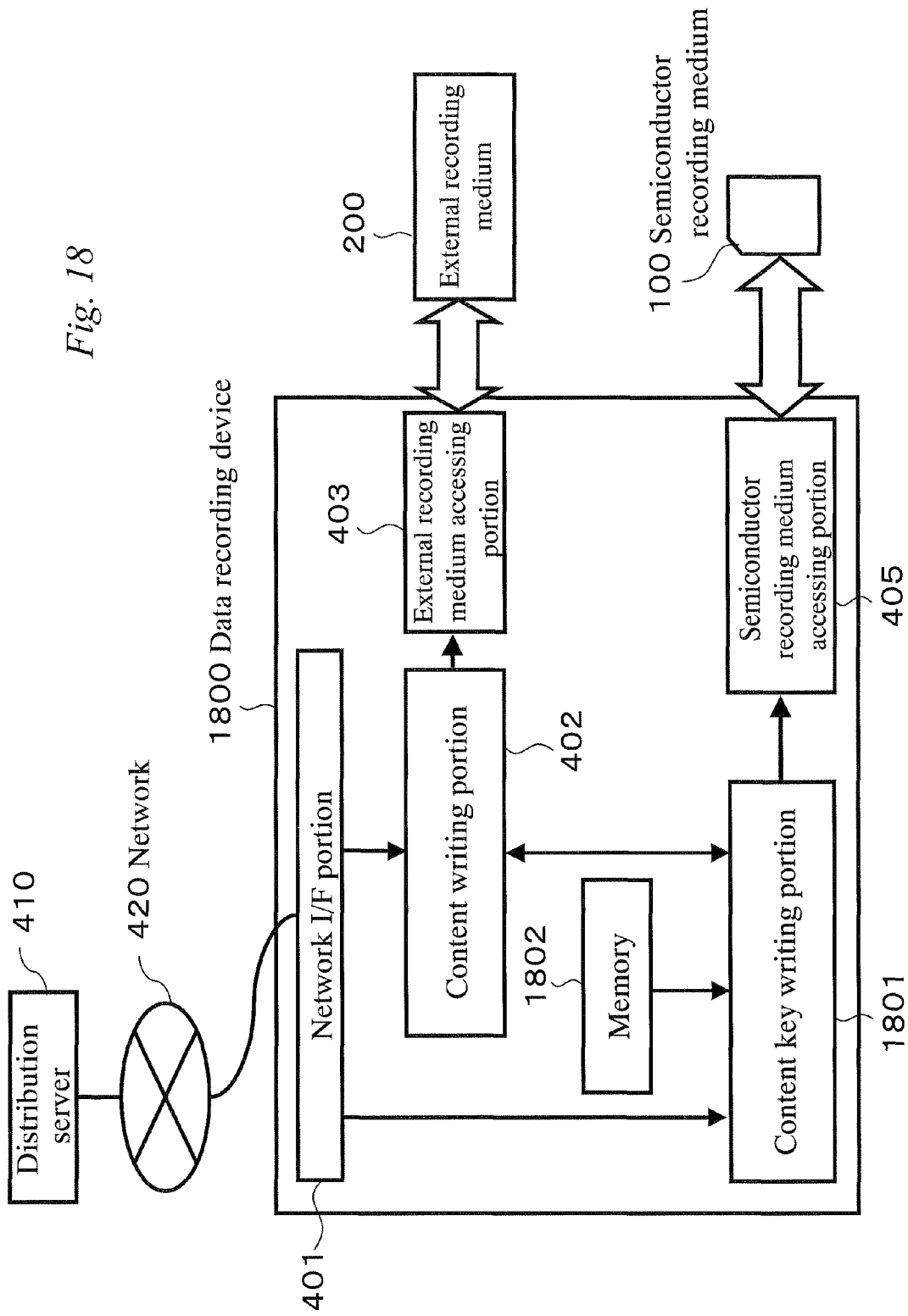
FIG. 18 is a diagram illustrating a configuration of a data recording device in the fourth embodiment of the present invention.
Figure 19:
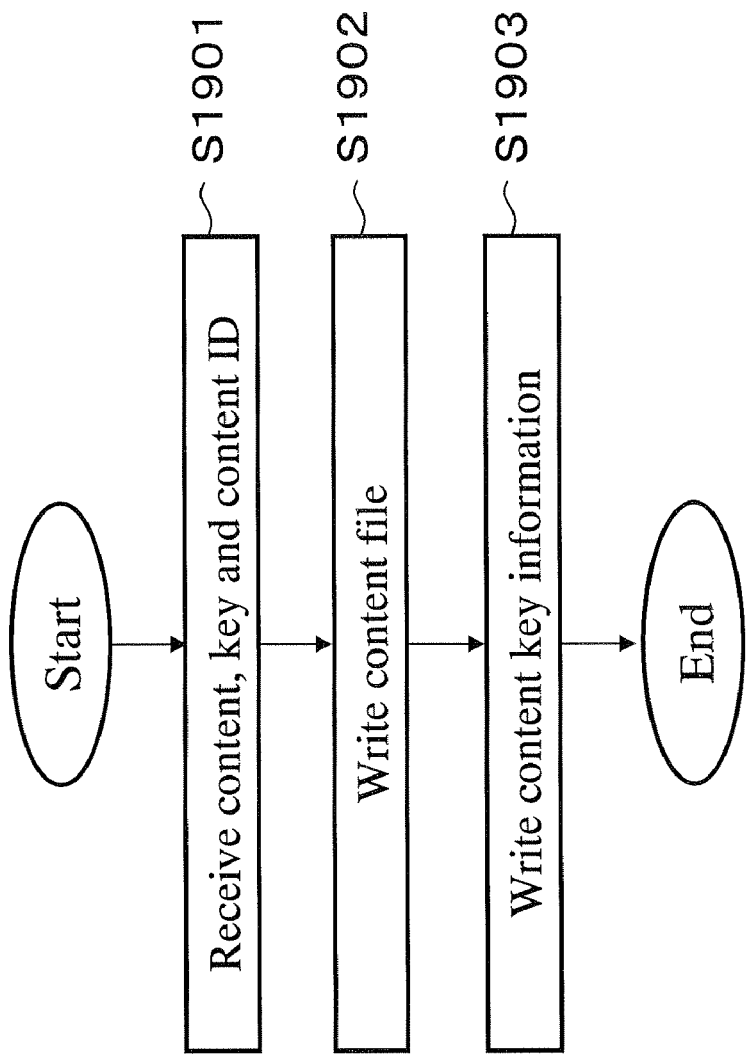
FIG. 19 is a flowchart illustrating an exemplary process sequence of the data recording device of FIG. 18.

Referring next to FIGS. 18 and 19, the configuration of a data recording device employing the data storing method according to the present embodiment will be described along with a process sequence in which the data recording device writes content to the semiconductor recording medium 100.

FIG. 18 is a diagram illustrating the configuration of a distribution-content-compatible data recording device 1800. The data recording device 1800 is configured in a similar manner to the data recording device 400 shown in FIG. 4, except that a content key writing portion 1801 functions in a slightly different manner from its counterpart, and memory 1802 having device information stored therein is included. Note that elements having the same functions as those in the configuration shown in FIG. 4 are denoted by the same characters, and the descriptions thereof will be omitted.

Figure 16:
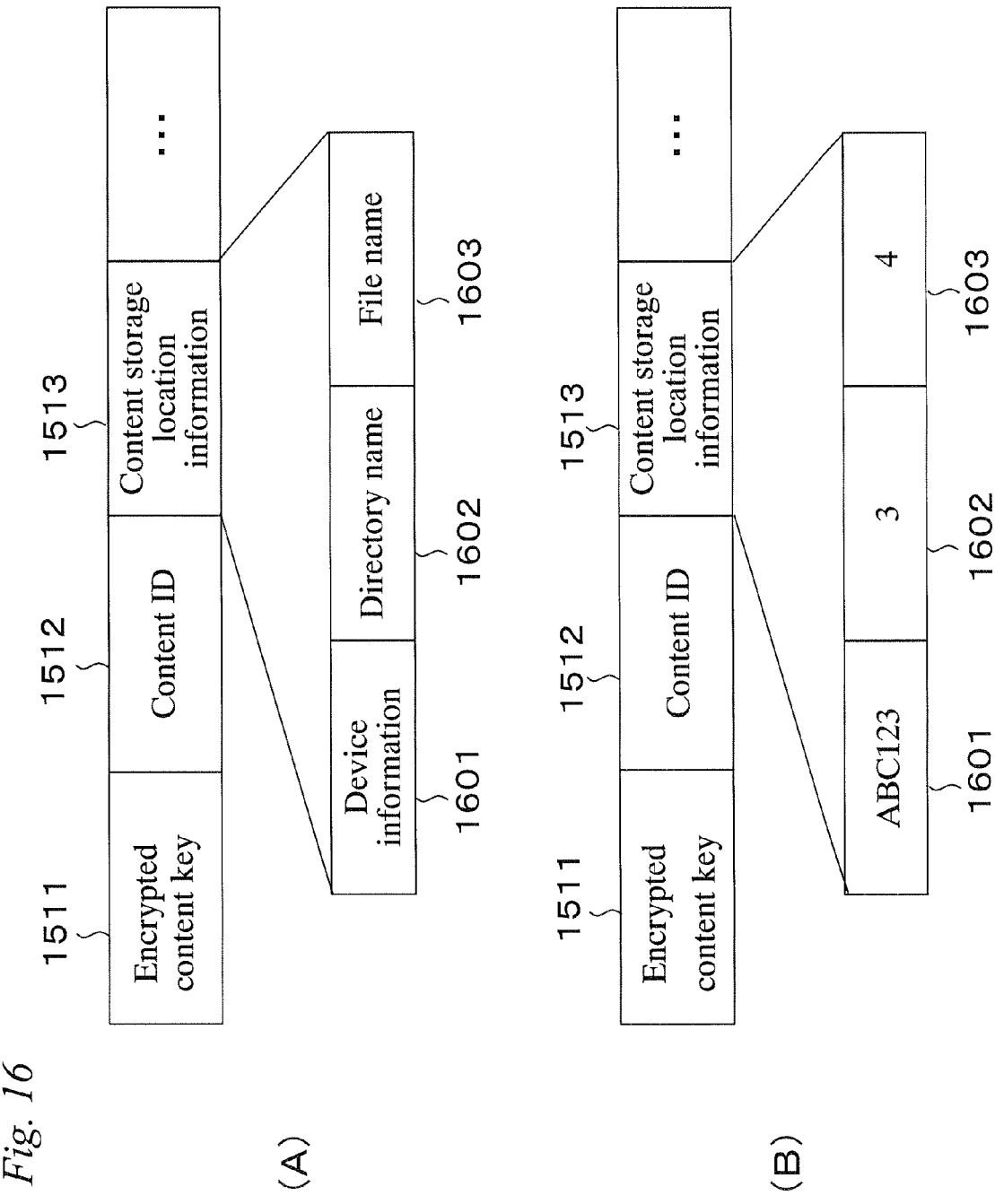
FIG. 16 is a diagram illustrating an exemplary structure of the content key information in the fourth embodiment of the present invention.
Figure 17:
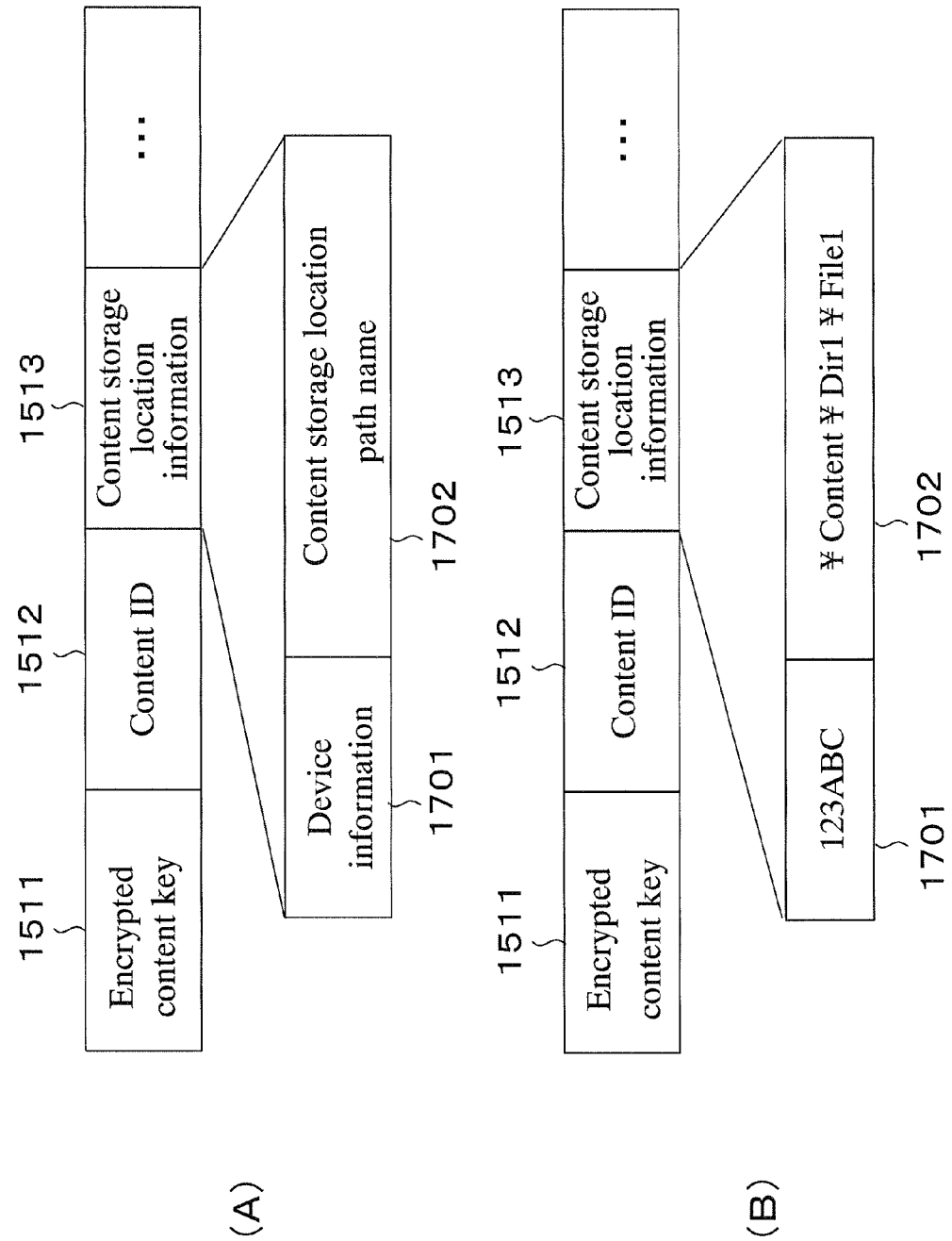
FIG. 17 is a diagram illustrating another exemplary structure of the content key information in the fourth embodiment of the present invention.

The content key writing portion 1801 has a function of writing the content key information 1510 shown in FIGS. 15 to 17 to the semiconductor recording medium 100 via the semiconductor recording medium accessing portion 405; specifically, a piece, or pieces, of information 1702, or 1602 and 1603, concerning where the content writing portion 402 has stored the encrypted content 1511 in the external recording medium 200, the device information 1601, which is information stored in the memory 802, concerning the data recording device 1800, and the content ID 1512 uniquely assigned to the content are written along with the encrypted content key 1511.

Note that the device information 1601 or 1701 is device unique ID information or model information, which is pre-recorded in the memory 1802 of the data recording device 1800, for the purpose of being incorporated into the content key information 1510.

FIG. 19 is a flowchart illustrating an exemplary process sequence in which distribution content and a content key received by the distribution-content-compatible data recording device 1800 are stored to the external recording medium 200 and the semiconductor recording medium 100, respectively.

Referring to the flowchart of FIG. 19, the operation of the data recording device 1800 will be described in relation to the case where the content key information shown in FIG. 16 is used. First, the network I/F portion 401 of the data recording device 1800 receives content, a content key and a content ID from the distribution server 410 via the network 420 connected thereto (S1901). Note that the content distributed by the distribution server 410 is encrypted with the content key, and the content key is encrypted with the aforementioned service unique key arbitrarily determined within the distribution service.

Next, the content writing portion 402 stores the received encrypted content, along with the received content ID, to the external recording medium 200 via the external recording medium accessing portion 403 (S1902).

Next, the content key writing portion 1801 stores pieces of information 1602 and 1603, concerning the storage location where the content writing portion 402 has stored the encrypted content in the external recording medium 200, and device information 1601 indicating information concerning the data recording device 400, along with the received content ID 1512 and encrypted content key 1511, to the user data area 133 of the semiconductor recording medium 100 via the semiconductor recording medium accessing portion 405 (S1903). In this manner, the data recording device 1800 stores the content key information 1510 of the distribution content to the semiconductor recording medium 100 in accordance with the storing method as shown in FIG. 15.

Figure 20:
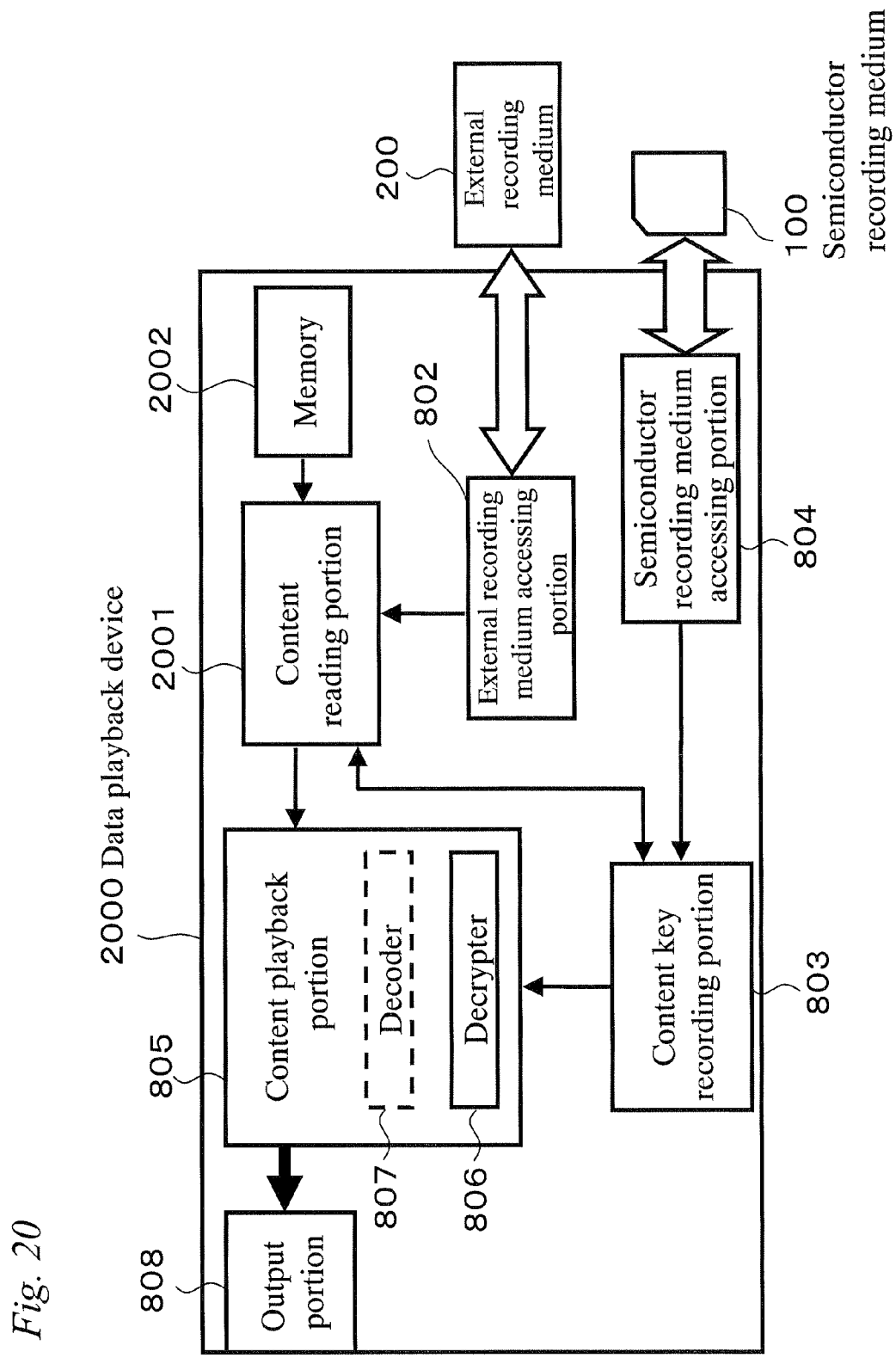
FIG. 20 is a diagram illustrating a configuration of a data playback device in the fourth embodiment of the present invention.
Figure 21:
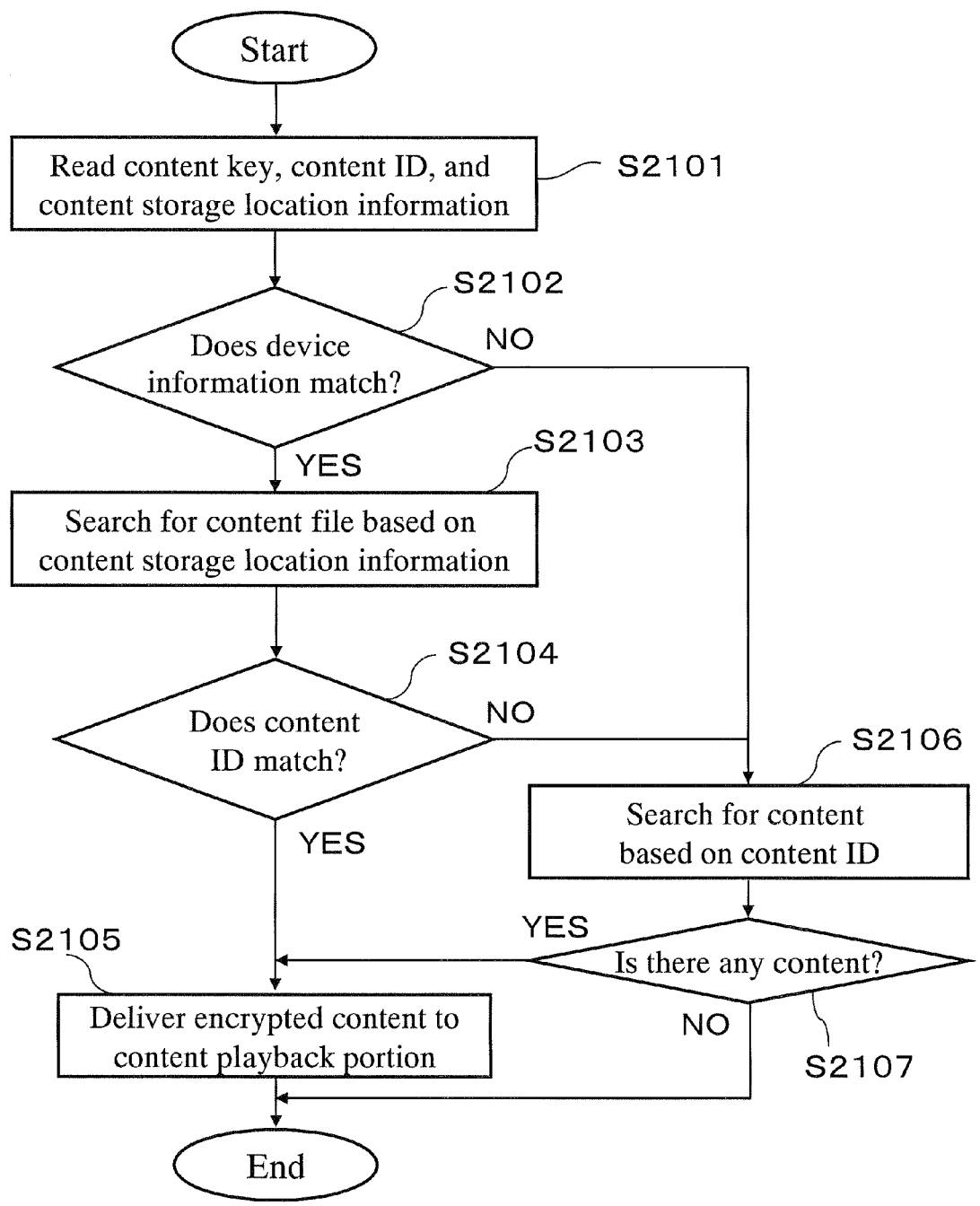
FIG. 21 is a flowchart illustrating an exemplary process sequence of the data playback device of FIG. 20.

Referring next to FIGS. 20 and 21, the configuration of a data playback device employing the data playback method according to the present embodiment will be described along with a process sequence in which the data playback device plays back content stored in the semiconductor recording medium 100.

FIG. 20 is a block diagram illustrating the configuration of a data playback device 2000. The data playback device 2000 is configured in a similar manner to the data playback device 800 shown in FIG. 8, except that a content reading portion 2001 functions in a slightly different manner to its counterpart, and memory 2002 having device information pre-recorded therein is included. Note that elements having the same functions as those in the configuration in FIG. 8 are denoted by the same characters, and the descriptions thereof will be omitted.

The content reading portion 2001 reads a content file 1520 from the external recording medium 200 based on content storage location information 1513 and a content ID 1512, which are passed from the content key reading portion 803, as well as device information 1601 pre-recorded in the memory 2002. Specifically, the content reading portion 2001 searches for a content file 1520 that has the same content ID 1512 and the same content storage location information 1513 from among the content files 1520 stored in the external recording medium 200.

FIG. 21 is a flowchart illustrating an exemplary process sequence in which the data playback device 2000 plays back content stored in the external recording medium 200.

In the data playback method of the present embodiment, in order to read content storage location information 1513 of a content file that is to be played back from the content key information 1510 stored in the semiconductor recording medium 100, first, it is necessary to extract the content ID 1512 of the content file that is to be played back from the content key information 1510 stored in the semiconductor recording medium 100. However, a known playlist is generated based on information in the content file stored in the external recording medium 200, and therefore without any modification, it is not possible to identify the content ID 1512 of the content file that is to be played back, using the content key information 1510 stored in the semiconductor recording medium 100.

Therefore, as in the second embodiment, it is necessary to process the playlist before finding the corresponding content storage location information 1513 based on the content key information 1510 stored in the semiconductor recording medium 100. Specifically, the content reading portion 2001 of the data playback device 2000 reads the playlist stored in the external recording medium 200, while instructing the content key reading portion 803 to read the content key information 1510 stored in the semiconductor recording medium 100, and generates a new playlist for content files associated with the same content ID.

Based on the playlist, the content key reading portion 803 of the data playback device 2000 reads an encrypted content key 1511, a content ID 1512, and content storage location information 1513, which are associated with the content that is to be played back, from the semiconductor recording medium 100 via the semiconductor recording medium accessing portion 804 (S2101). Of these pieces of information, the content ID 1512 and the content storage location information 1513 are passed to the content reading portion 2001.

Note that the content key 221 is encrypted with the service unique key 203 as described with respect to FIG. 2, and therefore the service unique key 203 is read via the semiconductor recording medium accessing portion 804, and the content key 221 is decrypted with the service unique key 203, thereby generating a plaintext content key 202. However, the service unique key 203 is stored in the semiconductor recording medium 100 after being encrypted with the medium unique key 204, and therefore it is necessary to read the encrypted service unique key 230 and the medium unique key 204 to calculate a plaintext service unique key 203.

The content key 202 thus obtained is passed to the content playback portion 470. Note that the reading of the medium unique key 204 and the reading of the encrypted service unique key 221 are made possible as a result of mutual validity authentication between the semiconductor recording medium accessing portion 804 and the semiconductor recording medium 100.

Next, the content reading portion 2001 distinguishes whether the device information 1601 contained in the content storage location information 1513 passed from the content key reading portion 803 matches the device information recorded in the memory 2002 of the data playback device 2000 (S2102).

In step S2102, when the device information contained in the content storage location information 1513 matches the device information of the data playback device 2000, the content reading portion 2001 searches for a content file 1520 stored in the external recording medium 200 based on the content storage location information (S2103).

Next, the content reading portion 2001 distinguishes whether a content ID 1521 contained in the found content file 1520 matches the content ID 1512 passed from the content key reading portion 803 (S2104).

When the content ID matches in step S2104 (YES), encrypted content 1522 is passed to the content playback portion 805 (S2105). In the content playback portion 805, the decrypter 806 decrypts the encrypted content 1522 with the content key acquired from the content key reading portion 803. Although not shown in the figure, the decoder 807 performs data decompression on the decrypted content, and passes it to the output portion 808 for content playback.

On the other hand, when the device information does not match in step S2102 (NO) or the content ID does not match in step S2104 (NO), a search for the content file 1520 stored in the external recording medium 200 is carried out based on the content ID 1512 (S2106). In the key-separation-type content management method, the content keys and their respective content are separately managed, and therefore it is possible that only the content files are updated. In such a case, the device information might match in step S2102, but the content ID might not match in step S2104.

If any content file having a matching content ID is not found in step S2107 (NO), the procedure is terminated. If any such content file is found (YES), the encrypted content is passed to the content playback portion 805, and processed in a similar manner to that as described above, thereby performing content playback.

As described above, the content storage location information contained in the content key information is used to correlate pieces of encrypted content with their respective content keys, thereby making it possible to significantly increase the speed of searching for encrypted content in the data playback device.

While the present embodiment has been described with respect to the example where the device information contains device unique information and model information, the device information is not limited to these two forms. Any information can be used so long as the device can distinguish the content file storage location information. Accordingly, for example, no information may be contained as the device information. In addition, for example, possible directories and file structures, in which content files are stored, may be determined in advance, and information indicating their structure types may be used in place of the device information. In addition, a special value may be preset for the device information, e.g., when all digits in the device information are "1", the device information may be storage location information of a content file that is stored in the same recording medium as its corresponding content key.

Figure 22:
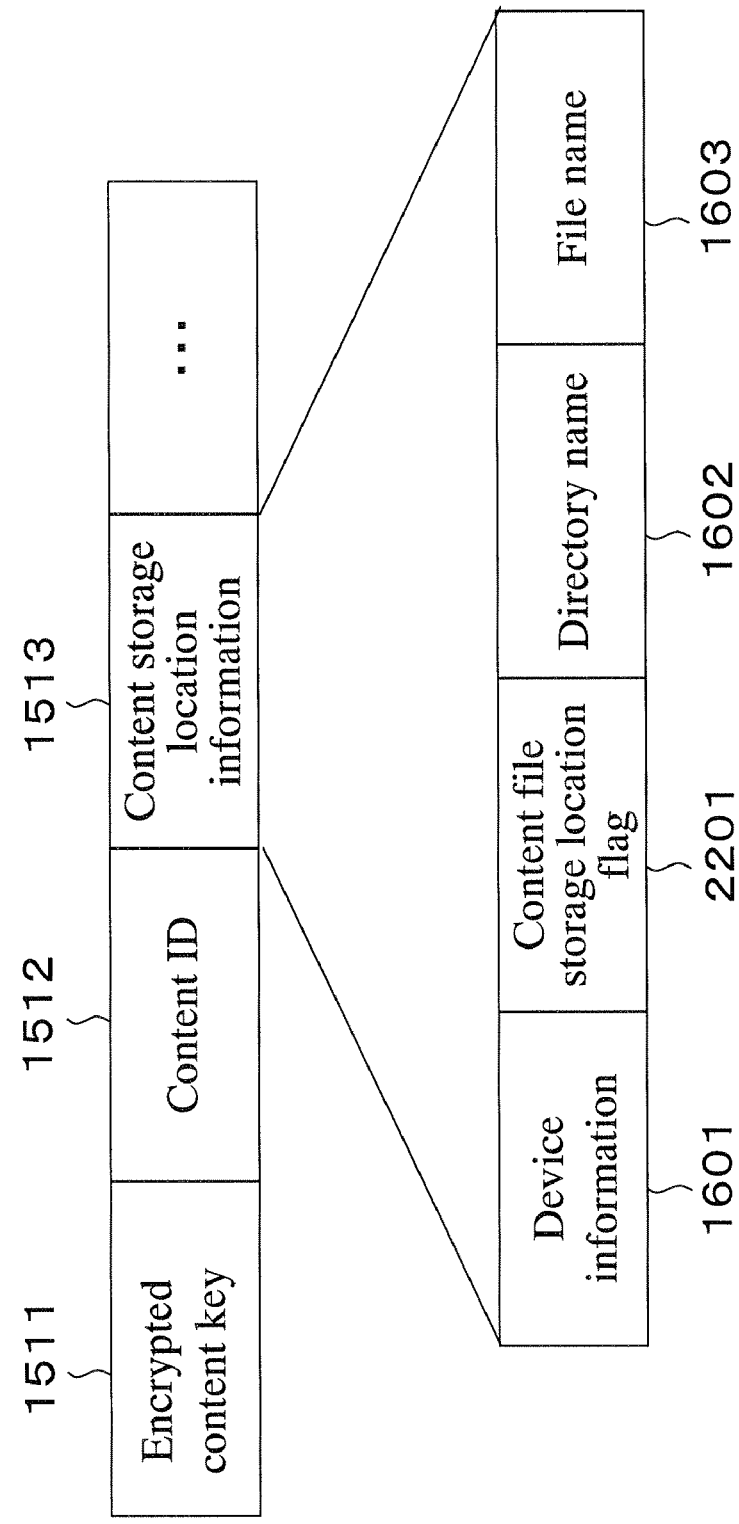
FIG. 22 is a diagram illustrating another exemplary structure of the content key information in the fourth embodiment of the present invention.

In addition, as shown in FIG. 22, the content storage location information 1513 may contain flag information 2201, which indicates "1" when the content key and the content file are stored in the same recording medium and "0" when the content key and the content file are stored in different recording media. In addition, the flag information 2201 does not have to be stored within the content storage location information 1513, and can be stored anywhere within the content key information 1510.

While the present embodiment has been described with respect to the case where the content storage location information 1513 contained in the content key information 1510 is used to correlate the encrypted content with the content key, it is possible to correlate the encrypted content with the content key using the content key storage location information 1523 contained in the content file 1520 as shown in FIG. 15. In such a case, the content key storage location information 1523 may contain a directory name and a file name, by both of which the storage location of the encrypted content key is indicated, so that by performing processing in a manner similar to that described above in the present embodiment, it becomes possible to quickly search for an encrypted content key corresponding to encrypted content that is to be played back.

In addition, the data storing method of the present embodiment is also applicable to the case where the local-content-compatible data recording device shown in FIG. 6 is used to write the encrypted content to the external recording medium. Also, while the external recording medium 200 is used as a medium for recording content in the present embodiment, the content may be recorded to the memory included in the data recording device 1800, rather than to the external recording medium 200.

Fifth Embodiment

Figure 23:
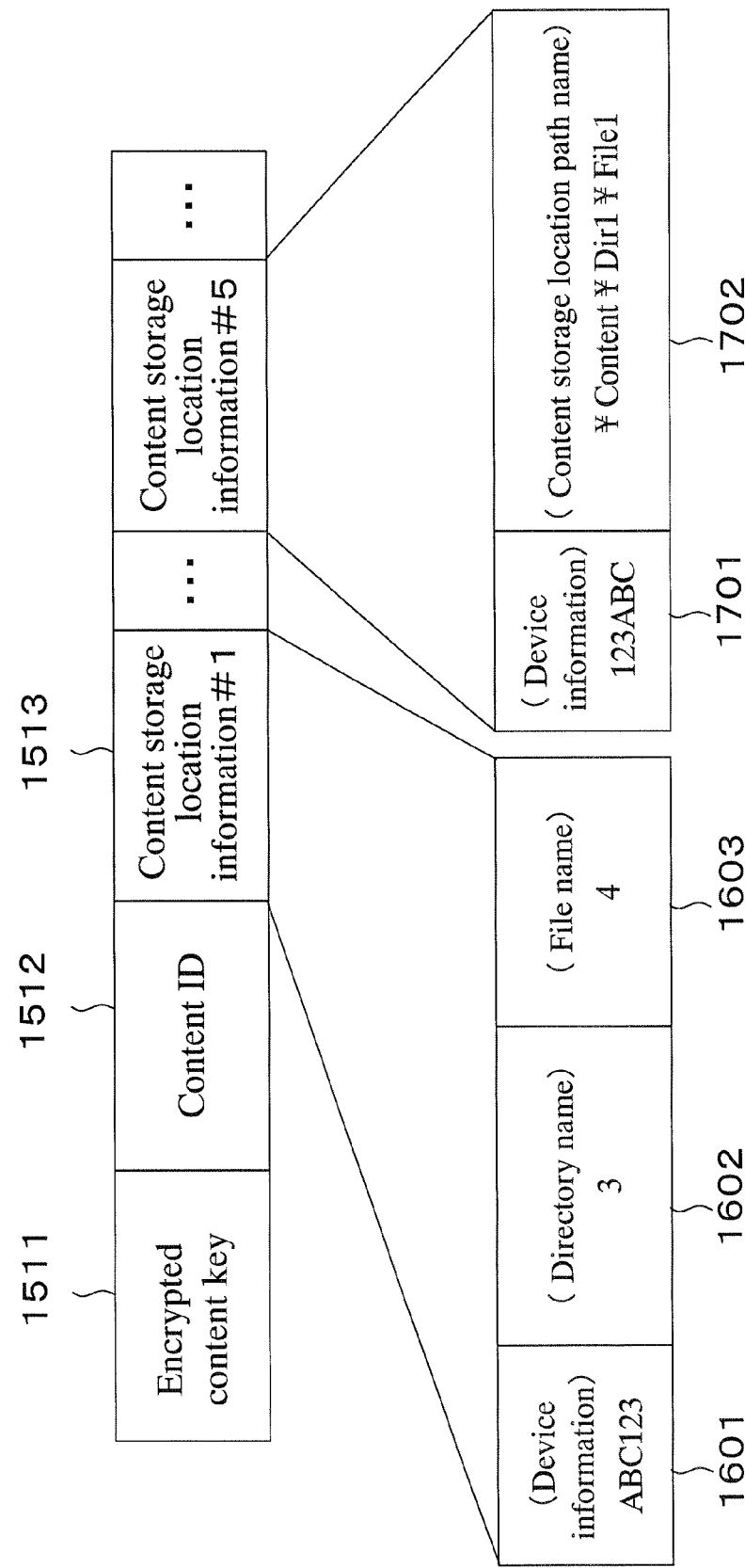
FIG. 23 is a diagram illustrating an exemplary structure of content key information in a fifth embodiment of the present invention.

FIG. 23 is a diagram illustrating the structure of content key information 1510 stored in the semiconductor recording medium 100 in accordance with a fifth embodiment of the present invention. A difference from the fourth embodiment is that the content key information 1510 contains a plurality of pieces of content storage location information 1513. Other features are basically the same as those in the fourth embodiment. Herein, the difference from the fourth embodiment will be described.

In FIG. 23, up to five pieces of content storage location information 1513 can be stored within the area of a single piece of content key information 1510. Of these, content storage location information #1 contains a directory name 1602 and a file name 1603 as described with respect to (A) and (B) of FIG. 16. On the other hand, content storage location information #5 contains a path name in a manner similar to that described with respect to (A) and (B) of FIG. 17.

Figure 24:
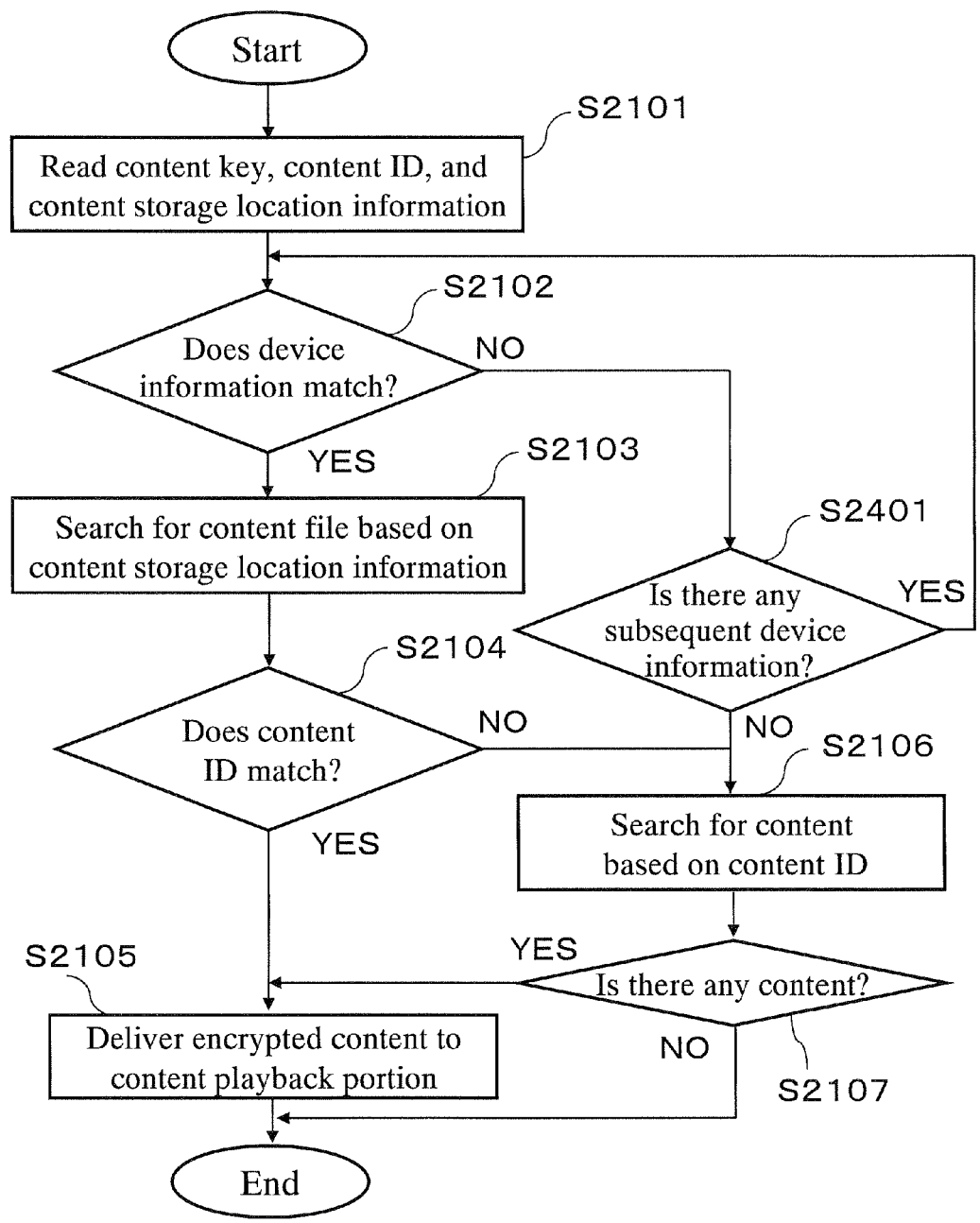
FIG. 24 is a flowchart illustrating an exemplary process sequence of a data playback device in the fifth embodiment of the present invention.

FIG. 24 is a flowchart illustrating an exemplary process sequence in which the data playback device 2000 according to the fourth embodiment described with respect to FIG. 20 plays back content stored in the external recording medium 200 using the content key information 1513 shown in FIG. 23.

A difference from the flowchart illustrated in FIG. 21 with respect to the fourth embodiment is that processing in step S2401 is added. Other steps are the same as those in the fourth embodiment, and therefore only the processing in step S2401 will be described here.

When the device information 1601 does not match in step S2102, it is distinguished whether the device information is present in the next content storage location information after the content storage location information 1513 that is currently being referenced in the content key information 1510. When the next content storage location information contains the device information, the content storage location information that is currently being held is updated to the next content storage location information, and the procedure returns to step S2102. Note that when there is no subsequent device information, the procedure proceeds to step S2106.

In the present embodiment, a plurality of regions in which to store the content storage location information are provided within the content key information, and therefore it is possible to keep the area (size) of the content key information constant, while achieving high-speed content search by a plurality of devices.

It will be appreciated that the present invention is not limited to the above embodiment. Variations can be made without departing from the intent of the present invention. The present invention also encompasses the following cases.

(1) While the present embodiment has been described with respect to the example where five pieces of content storage location information can be stored within the content key information, the number thereof is not necessarily limited to five. Any number of pieces can be contained so long as it is a finite number.

(2) While the present embodiment has been described with respect to the example where the content storage location information that can be stored within the content key information is composed of the device information and content storage location-related information that depends on the device information, such a form is not restrictive. Any form can be used so long as information concerning the content storage location can be stored within the content key information, e.g., only a piece of device information may be stored for the same device, whereas a plurality of pieces of content storage location information may be stored in association with that device information.

Sixth Embodiment

Figure 25:
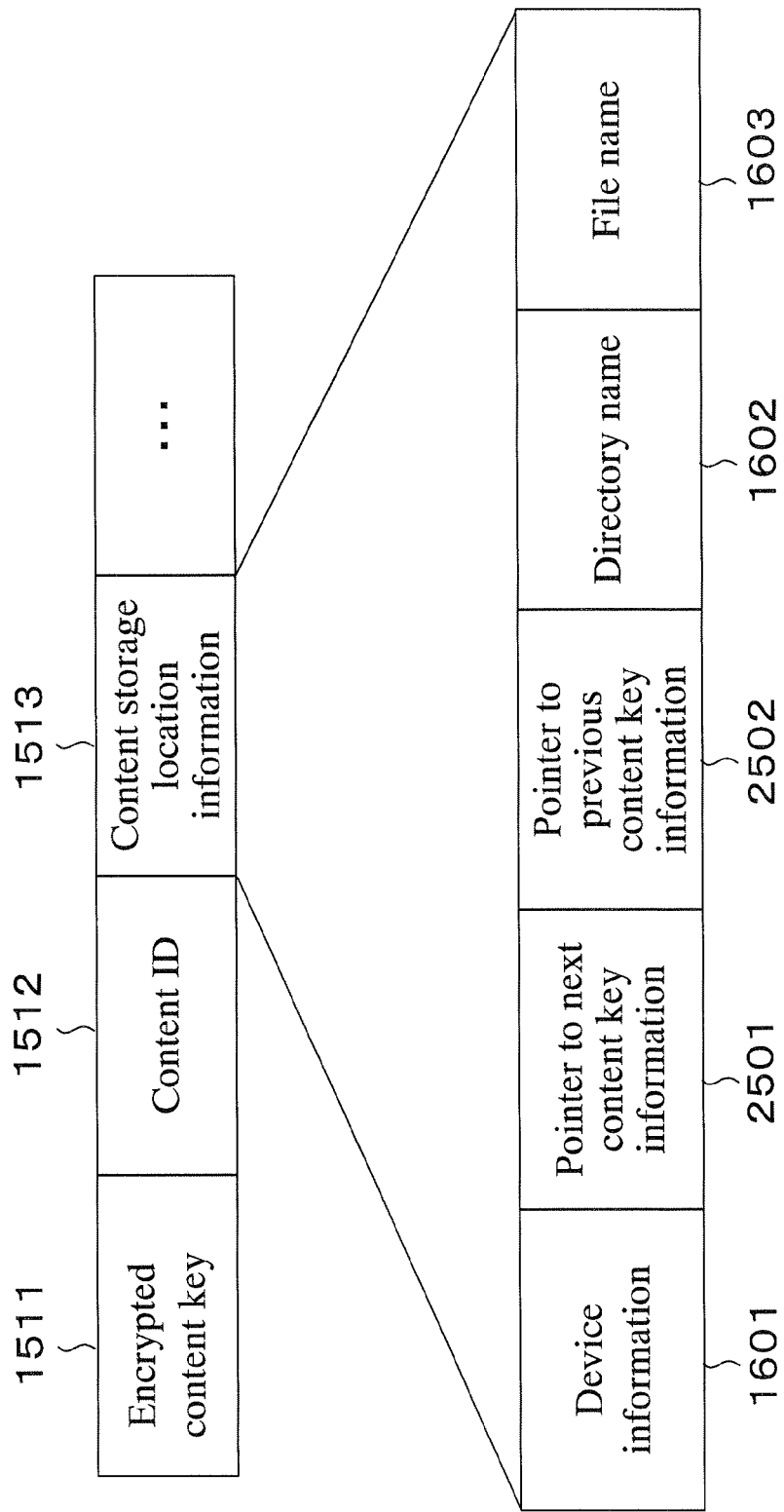
FIG. 25 is a diagram illustrating an exemplary structure of content key information in a sixth embodiment of the present invention.

FIG. 25 is a diagram illustrating the structure of content key information 1510 stored in the semiconductor recording medium 100 in accordance with a sixth embodiment of the present invention. The content key information in the present embodiment differs from the content key information in the fourth embodiment in that a plurality of pieces of content key information are used for the same content ID, thereby making it possible to store a plurality of pieces of content storage location information for the same content ID.

Although the size of an entry of the content key information is fixed, the present embodiment is effective in storing a plurality of pieces of device information. Other features are basically the same as those in the fourth embodiment, and therefore only the difference from the first embodiment will be described here.

In FIG. 25, the "pointer to next content key information 2501" is index information indicating a pointer to the next content key information in which the same content ID is stored. The "pointer to previous content key information 2502" is index information indicating a pointer to content key information to which the same content ID is assigned and in which index information indicating a pointer to the current content key information is stored.

Figure 26:
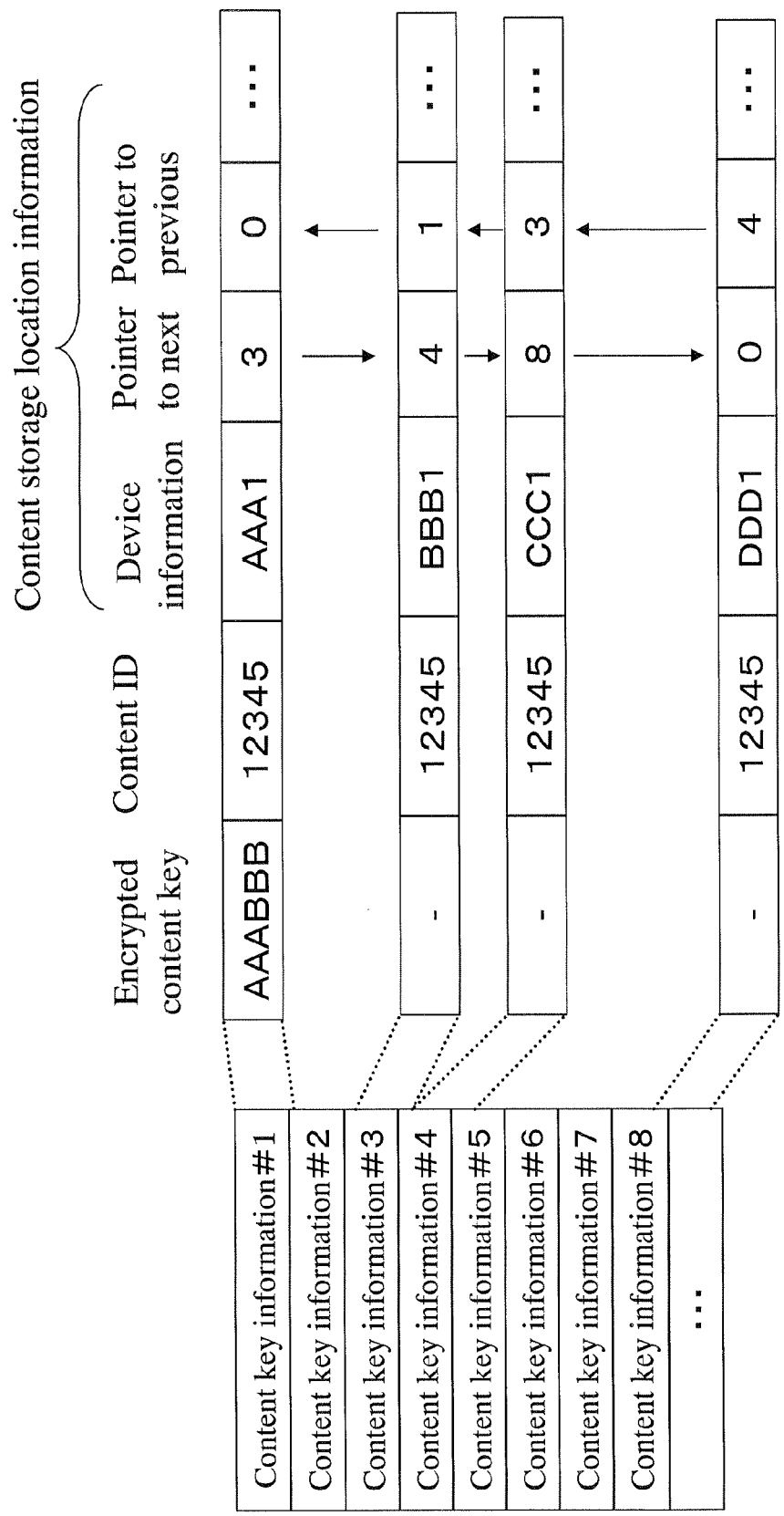
FIG. 26 is a diagram illustrating a concrete example of the content key information of FIG. 25.

FIG. 26 is a diagram illustrating a concrete example of the content key information. Content key information #1 contains "AAABBB" and "12345", which are respectively an encrypted content key and a content ID, and furthermore, stored within the area of the content storage location information are "AAA1, "3" and "0", which are respectively device information, a pointer to next content key information, and a pointer to previous content key information.

In the content key information #1, content storage location information for a device corresponding to "AAA1" is stored as the device information. In addition, "3", which is stored as a "pointer to next", denotes that content key information #3 is also used as information for the same content ID. In addition, there is no content key information in which pointer information pointing to the content key information #1 is stored, and therefore "0" is stored as a "pointer to previous".

In the content key information #3, the same content ID as that stored within the content key information is stored. It is shown that content storage location information for a device corresponding to device information "BBB1" is stored within the content key information #3. In addition, "1", which denotes the content key information #1, is stored as the "pointer to previous". As for the encrypted content key, a value for the content key information #1 is used for information concerning the same content, and therefore no valid value is stored within the region in which to store the encrypted content key.

In subsequent pieces of content key information, content storage location information of content for the same content ID is also stored as the pointer information. In content key information #8, "0" is stored as the "pointer to next", which means that no subsequent content key information is used.

Here, it is assumed that only the encrypted content key stored within content key information, in which "0" is stored as the pointer to previous content key information, is a valid value for the same content ID.

Figure 27:
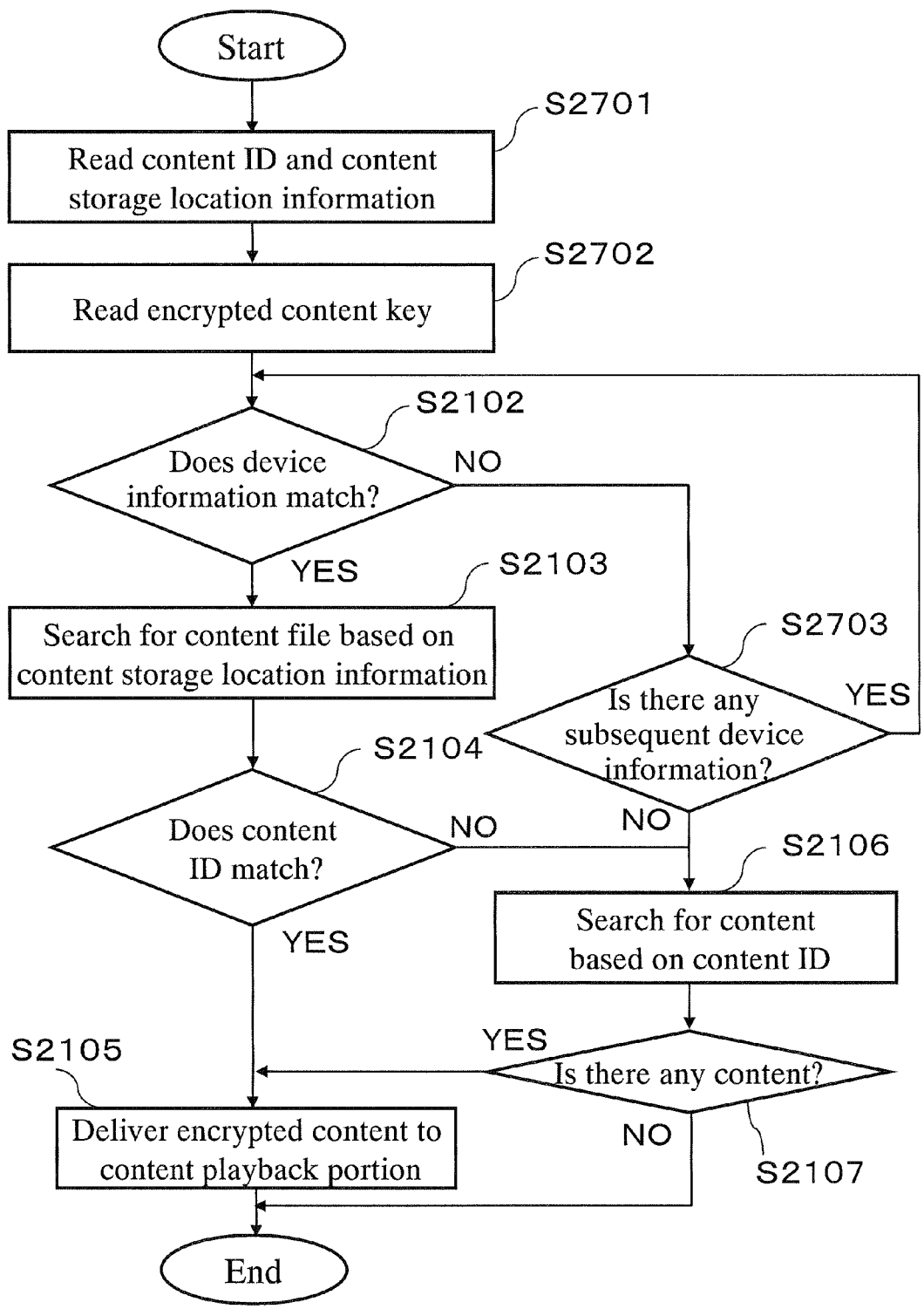
FIG. 27 is a flowchart illustrating an exemplary process sequence of a data playback device in the sixth embodiment of the present invention.

FIG. 27 is a flowchart illustrating an exemplary process sequence in which the data playback device 2000 according to the fourth embodiment described with respect to FIG. 20 plays back content stored in the external recording medium 200 using the semiconductor recording medium 100 having stored therein the content key information shown in FIG. 25.

FIG. 27 differs from the flowchart of FIG. 21 in that the details of processing in step S2701 differ from step S2101, and processing in steps S2702 and S2703 is added. Only the details of processing in steps S2701, S2702 and S2703 will be described here.

The content key reading portion 803 of the data playback device 2000 reads a content ID 1512 and content storage location information 1513 from the semiconductor recording medium 100 via the semiconductor recording medium accessing portion 804 (S2701).

Next, the content reading portion 801 checks the "pointer to previous content key information" stored within the content key information, and if the value thereof is not "0", the pointer is used until any content key information with the value "0" is found, thereby reading a valid encrypted content key 1511 (S2702). Note that processing required for decrypting the encrypted content 1511 has been described in detail with respect to FIG. 20, and therefore the description thereof will be omitted herein.

When the processing in step S2703 is performed for the first time, the content key information in which the encrypted content key found in step S2702 is stored is content key information that is currently being held by the device. When the device information stored within the content key information 1510 does not match, it is distinguished whether the pointer to next content key information, which is contained in the content key information described with respect to FIG. 25, is "0". If it is not "0", the content key information that is currently being held by the device is updated to the next content key information, and the procedure proceeds to step S2102. On the other hand, if it is "0", the procedure proceeds to step S2106.

In the present embodiment, it is possible to store a plurality of pieces of content key information in which to store content storage location information for the same content ID, making it possible to keep the area (size) of the content key information constant, while achieving high-speed content search by a plurality of devices.

It will be appreciated that the present invention is not limited to the above embodiment. Variations can be made without departing from the intent of the present invention. The present invention also encompasses the following cases.

(1) While the present embodiment has been described with respect to the example where the content key information holds link information concerning previous content key information and next content key information, in both of which the same content ID is stored, such a method is not restrictive. The link information may concern only one of them or no link information may be contained. In addition, any configuration can be employed so long as a plurality of pieces of content key information containing the content storage location information are provided for the same content ID.

(2) While the present embodiment has been described with respect to the example where the encrypted content key stored within the content key information is valid when the pointer to previous content key information is "0", and encrypted content keys stored within other pieces of content information are invalid values, the encrypted content key stored within every piece of content key information may be valid. In addition, the content key information may contain information indicating whether the encrypted content key stored therein is valid.

(3) While the present embodiment has been described with respect to the content key information search method in which a sequential search is performed from the content key information that has a valid encrypted content key stored therein, based on the pointer information pointing to the next content key information, such a method is not restrictive. Any method can be employed so long as a search is performed on pieces of content key information containing content storage information for the same content ID.

(4) While the present embodiment has been described with respect to the example where the content storage location information stored within the content key information is composed of the device information and content storage location-related information that depends on the device information, such a form is not restrictive. Any form can be used so long as a plurality of pieces of information can be stored, concerning the content storage location, e.g., the device information may be stored within a particular piece of content key information, whereas no device information may be stored within other pieces of content key information.

As described above, by using the data storing method and the data playback method described in each embodiment of the present invention, it becomes possible to quickly correlate content keys with their respective pieces of encrypted content in the key-separation-type content management method, thereby achieving high-speed search for information required for content playback.

It will be appreciated that the present invention is not limited to the above embodiments. Variations can be made without departing from the intent of the present invention. The present invention also encompasses the following cases.

(1) While the embodiments of the present invention have been described with respect to the cases where the data recording devices are provided in the form mainly intended for distribution content as well as in the form mainly intended for local content, these two forms are not restrictive.

(2) While the embodiments of the present invention have been described with respect to the exemplary methods in which the data recording device uses the user unique key stored in the semiconductor recording medium, the data recording device may include a user unique key generating portion, which generates a user unique key and stores it to the semiconductor recording medium.

(3) While the embodiments of the present invention have been described with respect to the cases where the content key information and the content ID list are stored in the semiconductor recording medium, any recording medium can be used to implement similar functions so long as the recording medium is equipped with the copyright protection function, i.e., the recording medium has an area that can be accessed as a result of mutual validity authentication between the host device and the recording medium as in the case of the aforementioned protected area. Accordingly, the semiconductor recording medium is not restrictive.

(4) While the embodiments of the present invention have been described with respect to the cases where the service unique key is used as a key with which to encrypt the content key, this is not restrictive. In addition, the form in which the content key is stored is not limited and can be determined arbitrarily. For example, if security is ensured by another method, a plaintext content key may be stored without being encrypted.

(5) While the embodiments of the present invention have been described with respect to the cases where the FAT file system is used for the search information storage area, other file systems such as FAT32 and UDF may be used, or the size, record addresses, and so on, may be managed without using any file system.

(6) While the embodiments of the present invention have been described with respect to the methods in which a directory name and a file name, or a path name of a file storage location, are/is designated as storage location information of a content file, these are not restrictive. Any information can be used so long as it identifies the storage location of the content file.

(7) Regarding combinations of the content key information and the encrypted content, the embodiments of the present invention have been described with respect to the examples where the content ID list is held as well as the examples where various types of storage location information are stored, but for example, the content ID list may be stored within the content key information, while information concerning the storage location of the content key information may be stored within the content file. Conversely, the information concerning the storage location of the content may be stored within the content key information, while the content may be stored along with the content ID list.

(8) The embodiments of the present invention have been described, such that the content key information and the content file may be stored in the same recording medium, and in order to achieve such a configuration where the content file is stored in the same recording medium, information such as the flag shown in FIG. 22, which indicates that the content key information and the content file are stored in the same recording medium, may be stored within the content key information or the content ID list.

INDUSTRIAL APPLICABILITY

The data storing methods and the data playback methods of the present invention make it possible to achieve high-speed search for encrypted content associated with a content key, or a content key associated with encrypted content, even if there is an increase in the number of stored content keys and the number of pieces of stored encrypted content in the case of the key-separation-type content management method where pieces of encrypted content and their respective content keys are stored and managed in different recording media.

The invention claimed is:

1. A data storing method comprising the steps of:
(a) storing a plurality of content files to a first recording medium, wherein the content files contain their respective pieces of encrypted content that are encrypted with different encryption keys, and their respective pieces of ID information, each being uniquely assigned to a corresponding piece of the encrypted content;
(b) storing a plurality of pieces of key information to a second recording medium, wherein each piece of the key information contains one of said encryption keys and a piece of ID information in association with a corresponding piece of the encrypted content; and
(c) generating and storing a list to the second recording medium, wherein the list contains pieces of encryption key storage location information, each indicating where a corresponding one of said encryption keys is stored, and pieces of ID information, each being associated with a corresponding one of said encryption keys, and the list is sorted in accordance with the pieces of ID information.

2. A data storing method comprising the steps of:
(a) storing a plurality of content files to a first recording medium, wherein the content files contain their respective pieces of encrypted content that are encrypted with different encryption keys, and their respective pieces of ID information, each being uniquely assigned to a corresponding piece of the encrypted content;
(b) storing a plurality of pieces of key information to a second recording medium, wherein each piece of the key information contains one of said encryption keys and a piece of ID information in association with a corresponding piece of the encrypted content; and
(c) generating and storing a list to the first recording medium, wherein the list contains pieces of content storage location information, each indicating where a corresponding piece of the encrypted content is stored, and pieces of ID information, each being associated with a corresponding piece of the encrypted content, and the list is sorted in accordance with the pieces of ID information.

3. A data storing method comprising the steps of:
(a) storing a plurality of content files to a first recording medium, wherein the content files contain their respective pieces of encrypted content that are encrypted with different encryption keys, and their respective pieces of ID information, each being uniquely assigned to a corresponding piece of the encrypted content;
(b) storing a plurality of pieces of key information to a second recording medium, wherein each piece of the key information contains one of said encryption keys and a piece of ID information in association with a corresponding piece of the encrypted content, and also contains a piece of content storage location information, which indicates where the corresponding piece of the encrypted content is stored.

4. The data storing method according to claim 3, wherein the content storage location information contains device information concerning a device into which the first recording medium is loaded.

5. The data storing method according to claim 3, wherein the key information is composed of a plurality of pieces of information associated with the same ID information but different pieces of the device information.

6. The data storing method according to claim 3, wherein the key information contains pointer information that designates another piece of the key information associated with the same ID information.

7. The data storing method according to claim 3, wherein the key information contains a plurality of pieces of the content storage location information.

8. A data storing method comprising the steps of:
(a) recording a plurality of content files to a first recording medium, wherein the content files contain: their respective pieces of encrypted content that are encrypted with different encryption keys; their respective pieces of ID information, each being uniquely assigned to a corresponding piece of the encrypted content; and their respective pieces of key storage location information, each indicating where a corresponding one of the encryption keys associated with their respective pieces of the encrypted content is stored; and (b) recording a plurality of pieces of key information to a second recording medium, wherein each piece of the key information contains one of said encryption keys and a piece of ID information in association with a corresponding piece of the encrypted content.

9. A data playback method comprising the steps of:
(a) reading a piece of ID information that is associated with a piece of content that is to be played back, from a first recording medium having a plurality of content files stored therein, wherein the content files contain their respective pieces of encrypted content that are encrypted with different encryption keys, and their respective pieces of the ID information, each being uniquely assigned to a corresponding piece of the encrypted content;
(b) reading a list from a second recording medium having stored therein a plurality of pieces of key information and the list,
wherein each piece of the key information contains one of said encryption keys and a piece of ID information in association with a corresponding piece of the encrypted content, and
wherein the list contains pieces of encryption key storage location information, each indicating where a corresponding one of said encryption keys is stored, and pieces of ID information, each being associated with a corresponding one of said encryption keys, and the list is sorted in accordance with the pieces of ID information;
(c) searching the list to find a piece of the encryption key storage location information that is associated with a piece of the ID information that matches the ID information read from the first recording medium, and reading one of said encryption keys that is associated with the piece of the ID information from the key information based on the found encryption key storage location information; and
(d) decrypting the encrypted content read from the first recording medium with the encryption key read from the second recording medium.

10. A data playback method comprising the steps of:
(a) reading a piece of ID information that is associated with a piece of content that is to be played back, from a second recording medium having a plurality of pieces of key info nation stored therein, wherein the plurality of pieces of key information contain: their respective encryption keys associated with their respective pieces of encrypted content that are encrypted with different encryption keys and stored in a first recording medium; and their respective pieces of ID information, each being uniquely assigned to a corresponding piece of the encrypted content;
(b) reading a list from the first recording medium having stored therein a plurality of content files and the list,
wherein the content files each contain a corresponding piece of the encrypted content and a piece of ID information associated therewith, and
wherein the list contains pieces of content storage location information, each indicating where a corresponding piece of the encrypted content is stored, and pieces of ID information, each being associated with a corresponding piece of the encrypted content, and the list is sorted in accordance with the pieces of ID information;
(c) searching the list to find a piece of the content storage location information that is associated with a piece of the ID information that matches the ID information read from the second recording medium, and reading a piece of the encrypted content that is associated with the piece of the ID information from the first recording medium based on the found content storage location information;
(d) reading one of the encryption keys that is associated with the piece of the ID information from the second recording medium; and
(e) decrypting the encrypted content read from the first recording medium with the encryption key read from the second recording medium.

11. A data playback method comprising the steps of:
(a) reading a piece of content storage location information that is associated with a piece of content that is to be played back from a second recording medium with reference to a piece of ID information, wherein the second recording medium has a plurality of pieces of key information stored therein, and the plurality of pieces of key information contain: their respective encryption keys associated with their respective pieces of encrypted content that are encrypted with different encryption keys and stored in a first recording medium; their respective pieces of the ID information, each being uniquely assigned to a corresponding piece of the encrypted content; and their respective pieces of content storage location information, each indicating where a corresponding piece of the encrypted content is stored;
(b) reading a piece of the encrypted content that is associated with the piece of the ID information from the first recording medium based on the content storage location information read from the second recording medium, wherein the first recording medium has a plurality of content files stored therein, and the content files each contain a corresponding piece of the encrypted content and a piece of ID information associated with the corresponding piece of the encrypted content; and
(c) reading one of the encryption keys that is associated with the piece of the ID information from the second recording medium, and decrypting the encrypted content read from the first recording medium, with the one of the encryption keys.

12. The data playback method according to claim 11, wherein the content storage location information contains device information concerning a device into which the first recording medium is loaded.

13. The data playback method according to claim 11, wherein the key information is composed of a plurality of pieces of information associated with the same ID information but different pieces of the device information.

14. The data playback method according to claim 11, wherein the key information contains pointer information that designates another piece of key information associated with the same ID information.

15. The data playback method according to claim 11, wherein the key information contains a plurality of pieces of the content storage location information.

16. A data playback method comprising the steps of:
(a) reading a piece of key storage location information that is associated with a piece of content that is to be played back from a first recording medium with reference to a piece of ID information, wherein the first recording medium has stored therein pieces of encrypted content that are encrypted with different encryption keys and a plurality of pieces of key information, and the plurality of pieces of key information contain their respective pieces of ID information, each being uniquely assigned to a corresponding piece of the encrypted content, and their respective pieces of the key storage location information, each indicating where a corresponding one of the encryption keys associated with their respective pieces of the encrypted content is stored;

(b) reading one of the encryption keys that is associated with the piece of the ID information from the second recording medium based on the key storage location information read from the first recording medium, wherein the second recording medium has a plurality of pieces of key information stored therein, and the plurality of pieces of key information contain their respective encryption keys and their respective pieces of ID information in association with their corresponding pieces of the encrypted content;

(c) reading a piece of the encrypted content that is associated with the piece of the ID information from the first recording medium; and (d) decrypting the encrypted content read from the first recording medium, with the encryption key read from the second recording medium.

17. A data recording device comprising:
(a) a content writing portion for storing a plurality of content files to a first recording medium, wherein the content files contain their respective pieces of encrypted content that are encrypted with different encryption keys, and their respective pieces of ID information, each being uniquely assigned to a corresponding piece of the encrypted content; and
(b) a key writing portion for storing a plurality of pieces of key information to a second recording medium, wherein each piece of the key information contains one of said encryption keys and a piece of ID information in association with a corresponding piece of the encrypted content, wherein,
(c) the key writing portion generates and stores a list to the second recording medium, wherein the list contains pieces of encryption key storage location information, each indicating where a corresponding one of said encryption keys is stored, and pieces of ID information, each being associated with a corresponding one of said encryption keys, and the list is sorted in accordance with the pieces of ID information.

18. A data recording device comprising:
(a) a content writing portion for storing a plurality of content files to a first recording medium, wherein the content files contain their respective pieces of encrypted content that are encrypted with different encryption keys, and their respective pieces of ID information, each being uniquely assigned to a corresponding piece of the encrypted content; and
(b) a key writing portion for storing a plurality of pieces of key information to a second recording medium, wherein each piece of the key information contains an encryption key one of said encryption keys and a piece of ID information in association with a corresponding piece of the encrypted content, wherein,
(c) the content writing portion generates and stores a list to the first recording medium, wherein the list contains pieces of content storage location information, each indicating where a corresponding piece of the encrypted content is stored, and pieces of ID information, each being associated with a corresponding piece of the encrypted content, and the list is sorted in accordance with the pieces of ID information.

19. A data recording device comprising:
(a) a content writing portion for storing a plurality of content files to a first recording medium, wherein the content files contain their respective pieces of encrypted content that are encrypted with different encryption keys, and their respective pieces of ID information, each being uniquely assigned to a corresponding piece of the encrypted content; and
(b) a key writing portion for storing a plurality of pieces of key information to a second recording medium, wherein each piece of the key information contains a one of said encryption keys and a piece of ID information in association with a corresponding piece of the encrypted content, and also contains a piece of content storage location information, which indicates where the corresponding piece of the encrypted content is stored.

20. A data recording device comprising:
(a) a content writing portion for recording a plurality of content files to a first recording medium, wherein the content files contain: their respective pieces of encrypted content that are encrypted with different encryption keys; their respective pieces of ID information, each being uniquely assigned to a corresponding piece of the encrypted content; and their respective pieces of key storage location information, each indicating where a corresponding one of the said encryption keys associated with their respective pieces of the encrypted content is stored; and
(b) a key writing portion for recording a plurality of pieces of key information to a second recording medium, wherein each piece of the key information contains one of said encryption keys and a piece of ID information in association with a corresponding piece of the encrypted content.

21. A data playback device comprising:
(a) a content reading portion for reading a piece of ID information that is associated with a piece of content that is to be played back, from a first recording medium having a plurality of content files stored therein, wherein the content files contain their respective pieces of encrypted content that are encrypted with different encryption keys, and their respective pieces of the ID information, each being uniquely assigned to a corresponding piece of the encrypted content; and
(b) a key reading portion for reading a list from a second recording medium having stored therein a plurality of pieces of key information and the list,
wherein each piece of the key information contains one of said encryption keys and a piece of ID information in association with a corresponding piece of the encrypted content, and
wherein the list contains pieces of encryption key storage location information, each indicating where a corresponding one of said encryption keys is stored, and pieces of ID information, each being associated with a corresponding one of said encryption keys, and the list is sorted in accordance with the pieces of ID information, wherein,
(c) the key reading portion searches the list to find a piece of the encryption key storage location information that is associated with a piece of the ID information that matches the ID information read from the first recording medium, and reads one of said encryption keys that is associated with the piece of the ID information from the key information based on the found encryption key storage location information, and (d) the content reading portion decrypts the encrypted content read from the first recording medium with said encryption key read by the key reading portion.

22. A data playback device comprising:

(a) a key reading portion for reading a piece of ID information that is associated with a piece of content that is to be played back, from a second recording medium having a plurality of pieces of key information stored therein, wherein the plurality of pieces of key information contain: their respective encryption keys associated with their respective pieces of encrypted content that are encrypted with different encryption keys and stored in a first recording medium; and their respective pieces of ID information, each being uniquely assigned to a corresponding piece of the encrypted content; and (b) a content reading portion for reading a list from the first recording medium having stored therein a plurality of content files and the list, wherein the content files each contain a corresponding piece of the encrypted content and a piece of ID information associated therewith, and wherein the list contains pieces of content storage location information, each indicating where a corresponding piece of the encrypted content is stored, and pieces of ID information, each being associated with a corresponding piece of the encrypted content, and the list is sorted in accordance with the pieces of ID information, wherein, (c) the content reading portion searches the list to find a piece of the content storage location information that is associated with a piece of the ID information that matches the ID information read from the second recording medium, and reads a piece of the encrypted content that is associated with the piece of the ID information from the first recording medium based on the found content storage location information, (d) the key reading portion reads one of the encryption keys that is associated with the piece of the ID information from the second recording medium, and (e) the content reading portion decrypts the encrypted content read from the first recording medium with the encryption key read by the key reading portion.

23. A data playback device comprising:

(a) a key reading portion for reading a piece of content storage location information that is associated with a piece of content that is to be played back from a second recording medium with reference to a piece of ID information, wherein the second recording medium has a plurality of pieces of key information stored therein, and the plurality of pieces of key information contain: their respective encryption keys associated with their respective pieces of encrypted content that are encrypted with different encryption keys and stored in a first recording medium; their respective pieces of the ID information, each being uniquely assigned to a corresponding piece of the encrypted content; and their respective pieces of content storage location information, each indicating where a corresponding piece of the encrypted content is stored; and (b) a content reading portion for reading a piece of the encrypted content that is associated with the piece of the ID information from the first recording medium based on the content storage location information read from the second recording medium, wherein the first recording medium has a plurality of content files stored therein, and the content files each contain a corresponding piece of the encrypted content and a piece of ID information associated with the corresponding piece of the encrypted content, wherein, (c) the key reading portion reads one of the encryption keys that is associated with the piece of the ID information from the second recording medium, and (d) the content reading portion decrypts the encrypted content read from the first recording medium, with the encryption key read by the key reading portion.

24. A data playback device comprising:

(a) a content reading portion for reading a piece of key storage location information that is associated with a piece of content that is to be played back from a first recording medium with reference to a piece of ID information, wherein the first recording medium has stored therein pieces of encrypted content that are encrypted with different encryption keys and a plurality of pieces of key information, and the plurality of pieces of key information contain their respective pieces of ID information, each being uniquely assigned to a corresponding piece of the encrypted content, and their respective pieces of the key storage location information, each indicating where a corresponding one of the encryption keys associated with their respective pieces of the encrypted content is stored; and (b) a key reading portion for reading one of the encryption keys that is associated with the piece of the ID information from the second recording medium based on the key storage location information read by the content reading portion, wherein the second recording medium has a plurality of pieces of key information stored therein, and the plurality of pieces of key information contain their respective encryption keys and their respective pieces of ID information in association with their corresponding pieces of the encrypted content, wherein, (c) the content reading portion decrypts the encrypted content read from the first recording medium, with the encryption key read from the second recording medium by the key reading portion.

25. A recording medium having stored therein:

(a) a plurality of pieces of key information that contain: their respective pieces of ID information uniquely assigned to their respective pieces of encrypted content that are encrypted with different encryption keys; and their respective encryption keys associated with their respective pieces of the encrypted content; and (b) a list that contains: pieces of encryption key storage location information, each indicating where a corresponding one of the encryption keys is stored; and pieces of ID information, each being associated with a corresponding one of the encryption keys, wherein the list is sorted in accordance with the pieces of ID information.

26. A recording medium having stored therein:

(a) a plurality of content files that contain: their respective pieces of encrypted content that are encrypted with different encryption keys; and their respective pieces of ID information, each being uniquely assigned to a corresponding piece of the encrypted content; and (b) a list that contains: pieces of content storage location information, each indicating where a corresponding piece of the encrypted content is stored; and pieces of ID information, each being associated with a corresponding piece of the encrypted content, wherein the list is sorted in accordance with the pieces of ID information.

27. A recording medium having stored therein a plurality of pieces of key information that contain: their respective encryption keys associated with their respective pieces of encrypted content that are encrypted with different encryption keys and stored in another recording medium; their respective pieces of the ID information, each being uniquely assigned to a corresponding piece of the encrypted content; and their respective pieces of content storage location information, each indicating where a corresponding piece of the encrypted content is stored.

28. A data recording medium having stored therein a plurality of content files that contain: their respective pieces of encrypted content that are encrypted with different encryption keys; their respective pieces of ID information, each being uniquely assigned to a corresponding piece of the encrypted content; and their respective pieces of encryption key storage location information, each indicating where a corresponding one of the encryption keys associated with their respective pieces of the encrypted content is stored.

* * * * *